US008276081B2

(12) United States Patent
Boyd

(10) Patent No.: US 8,276,081 B2
(45) Date of Patent: Sep. 25, 2012

(54) COMPUTER-BASED METHODS FOR ARRANGING MEETINGS AND SYSTEMS FOR PERFORMING THE SAME

(76) Inventor: John Edward Boyd, Ridgefield, CT (US)

( * ) Notice: Subject to any disclaimer, the term of this patent is extended or adjusted under 35 U.S.C. 154(b) by 712 days.

(21) Appl. No.: 12/376,730

(22) PCT Filed: Aug. 28, 2007

(86) PCT No.: PCT/US2007/076955
§ 371 (c)(1),
(2), (4) Date: Feb. 6, 2009

(87) PCT Pub. No.: WO2008/030729
PCT Pub. Date: Mar. 13, 2008

(65) Prior Publication Data
US 2010/0180211 A1    Jul. 15, 2010

Related U.S. Application Data

(60) Provisional application No. 60/924,532, filed on May 18, 2007, provisional application No. 60/841,969, filed on Sep. 2, 2006.

(51) Int. Cl.
*G06F 3/01* (2006.01)
(52) U.S. Cl. ...................................................... 715/751
(58) Field of Classification Search .................... 715/751
See application file for complete search history.

(56) References Cited

U.S. PATENT DOCUMENTS

| 5,459,859 | A | 10/1995 | Senda .......................... 395/600 |
| 5,796,395 | A | 8/1998 | de Hond ...................... 345/331 |
| 5,855,006 | A | 12/1998 | Huemoeller et al. ............ 705/9 |
| 5,857,708 | A | 1/1999 | Harvey ........................... 283/67 |
| 5,913,212 | A | 6/1999 | Sutcliffe et al. ................... 707/6 |
| 5,924,075 | A | 7/1999 | Kanemitsu ......................... 705/6 |
| 5,960,406 | A | 9/1999 | Rasansky et al. ................. 705/9 |
| 5,963,913 | A | 10/1999 | Henneuse et al. ................. 705/9 |
| 5,963,951 | A | 10/1999 | Collins .......................... 707/102 |
| 5,966,068 | A | 10/1999 | Wicks et al. ............ 340/286.01 |
| 5,974,406 | A | 10/1999 | Bisdikian et al. ................. 707/1 |
| 5,982,863 | A | 11/1999 | Smiley et al. ................. 379/112 |
| 6,009,403 | A | 12/1999 | Sato ................................. 705/6 |
| 6,016,478 | A | 1/2000 | Zhang et al. ...................... 705/9 |
| 6,052,122 | A | 4/2000 | Sutcliffe et al. ............... 345/331 |
| 6,061,681 | A | 5/2000 | Collins .............................. 707/5 |
| 6,073,105 | A | 6/2000 | Sutcliffe et al. ................... 705/1 |
| 6,175,842 | B1 | 1/2001 | Kirk et al. ...................... 715/205 |
| 6,216,110 | B1 | 4/2001 | Silverberg ........................ 705/9 |
| 6,363,352 | B1 | 3/2002 | Dailey et al. ...................... 705/9 |
| 6,392,760 | B1 | 5/2002 | Ahuja et al. .................. 358/400 |
| 6,963,900 | B2* | 11/2005 | Boyd ............................ 709/204 |
| 7,284,033 | B2* | 10/2007 | Jhanji .......................... 709/206 |
| 7,523,385 | B2* | 4/2009 | Nguyen et al. ................ 715/200 |
| 7,769,764 | B2* | 8/2010 | Ramer et al. .................. 707/751 |

(Continued)

OTHER PUBLICATIONS

U.S. Appl. No. 60/170,844, filed Feb. 2, 2001, Jhanji.

(Continued)

*Primary Examiner* — Weilun Lo
*Assistant Examiner* — Jessica Chuang

(57) ABSTRACT

Methods and systems for assisting individuals arrange meetings such as networking meetings with other individuals at a specified time (or within a specified time range) and at a specified place (or within a specified geographic region). More specifically, methods and systems for allowing individuals to post an invitation to for a meeting on an on-line network.

21 Claims, 9 Drawing Sheets

U.S. PATENT DOCUMENTS

| | | |
|---|---|---|
| 7,966,194 B2 * | 6/2011 | Iyer ................................ 705/1.1 |
| 2002/0194049 A1 * | 12/2002 | Boyd ................................. 705/9 |
| 2003/0018572 A1 * | 1/2003 | Beschle et al. ................... 705/37 |
| 2003/0027558 A1 | 2/2003 | Eisinger ...................... 455/414.1 |
| 2003/0187779 A1 * | 10/2003 | Han ................................. 705/38 |
| 2003/0204448 A1 * | 10/2003 | Vishik et al. .................... 705/27 |
| 2004/0161090 A1 * | 8/2004 | Digate et al. ............. 379/202.01 |
| 2005/0004983 A1 * | 1/2005 | Boyd ............................ 709/204 |
| 2005/0010443 A1 | 1/2005 | Zammitt ............................ 705/2 |
| 2005/0021750 A1 | 1/2005 | Abrams ........................ 709/225 |
| 2005/0120052 A1 * | 6/2005 | Miller et al. ............... 707/104.1 |
| 2005/0160094 A1 | 7/2005 | Morgenstern et al. ............ 707/9 |
| 2005/0165785 A1 | 7/2005 | Malkin et al. ................... 707/10 |
| 2005/0174975 A1 | 8/2005 | Mgrdechian et al. ......... 370/338 |
| 2005/0177614 A1 | 8/2005 | Bourne ......................... 709/200 |
| 2005/0193054 A1 | 9/2005 | Wilson .......................... 709/200 |
| 2005/0209999 A1 | 9/2005 | Jou .................................. 707/2 |
| 2005/0210409 A1 | 9/2005 | Jou ................................ 715/811 |
| 2005/0234781 A1 | 10/2005 | Morgenstern et al. .......... 705/26 |
| 2005/0272413 A1 | 12/2005 | Bourne ......................... 455/415 |
| 2006/0004590 A1 | 1/2006 | Khoo ................................ 705/1 |
| 2006/0052091 A1 * | 3/2006 | Onyon et al. ................. 455/415 |
| 2006/0184617 A1 | 8/2006 | Nicholas et al. .............. 709/203 |
| 2006/0230124 A1 | 10/2006 | Belfiore et al. ............... 709/219 |
| 2007/0113187 A1 * | 5/2007 | McMullen et al. ........... 715/742 |
| 2007/0143412 A1 | 6/2007 | Qi ................................ 709/206 |
| 2007/0179860 A1 * | 8/2007 | Romero ......................... 705/26 |
| 2007/0253424 A1 * | 11/2007 | Herot et al. ................. 370/395.2 |
| 2007/0276719 A1 * | 11/2007 | Franco ............................. 705/9 |
| 2007/0282661 A1 * | 12/2007 | Franco ............................. 705/9 |
| 2008/0215991 A1 * | 9/2008 | Berko et al. .................. 715/753 |
| 2009/0018903 A1 * | 1/2009 | Iyer ................................ 705/14 |
| 2009/0024439 A1 * | 1/2009 | Ryan et al. ....................... 705/9 |
| 2009/0037253 A1 | 2/2009 | Davidow ........................ 705/10 |
| 2010/0017371 A1 * | 1/2010 | Whalin et al. .................... 707/3 |

OTHER PUBLICATIONS

Search Report dated Apr. 22, 2008 which issued in corresponding International Application PCT/US07/76955.

* cited by examiner

COMPUTER-BASED METHODS FOR ARRANGING MEETINGS AND SYSTEMS FOR PERFORMING THE SAME

RELATED APPLICATION DATA

This application is a national stage application under 35 U.S.C. Section 371 of PCT International Application No. PCT/US07/76955, filed Aug. 28, 2007, hereby incorporated by reference, which claims priority to Provisional Patent Application Ser. No. 60/841,969, filed Sep. 2, 2006 and Provisional Patent Application Ser. No. 60/924,532, filed May 18, 2007, each hereby incorporated by reference.

BACKGROUND OF THE INVENTION

The present invention relates computer-based systems and methods for facilitating the arrangement of meetings between two or more individuals by allowing individuals to post electronic invitations and other individuals to review and accept such posted invitations.

Several publications are referenced in this application. The references describe the state of the art to which this invention pertains and are hereby incorporated by reference.

There are a variety of on-line networking services that allow users to learn about other users and possibly network with such other users, such as MySpace.com, Friendster.com, Orkut.com, and Plaxo.com. An online social network allows an individual to easily keep track of relationships that the individual has with other people by leveraging the internet. Each individual maintains his or her own account profile on the online social network, and defines who his or her related individuals are. Once defined, the online social network retains the relationship. Such services are passive in that they merely provide a means to learn of other users of similar interest, without providing an active means to initiate networking with those of specific interests. Thus, it would be desirable to provide an improved system and method which overcomes the above described disadvantages.

Evite.com allows users to send invitations for specific events to specific individuals selected by the user.

Meetup.com allows users to find "Meetups" with others who share a common interest or cause or create a "Meetup Group" for others to attend.

U.S. Pat. No. 6,963,900 to Boyd, commonly assigned with the present application and hereby incorporated by reference, discloses systems and methods that allow individuals to meet and network with other individuals at a specified time and place. According to the patented invention, a first user "posts" an invitation for a meeting which includes a proposed time (or time range) and place for the meeting and, if desired, any preferences or criteria such as who the first user is interested in meeting with (e.g., a computer scientist, an attorney, a resident from a particular city, alumni from a particular college, etc.). The "invitation" is reviewed by such users. When one or more users "accept" the "invitation", a meeting may be established.

SUMMARY OF THE INVENTION

The present invention relates to improved systems and methods that allow one or more individuals ("inviting individual" or "inviter") to meet or otherwise network or exchange information or tangibles with other individuals by creating and posting an electronic invitation including proposed meeting information (e.g., a specified time or time range, specific location or general location (e.g., neighborhood, zip code), purpose, etc.) at a website or other electronic location accessible by other users via the Internet or other computer-based network and allowing other individuals to review such invitations. Preferably, the systems and methods allow a user to generate an invite and publish or post the invite on a publicly accessible location such as a website and/or transmit the invite to other users (e.g., via email) and also generate a private invite which is only accessible and/or transmitted to selected other individuals (e.g., preferably via email) and not published on the website.

One aspect of the invention is to provide a method and apparatus which enables a user to generate and then advertise or post an invitation to a proposed meeting such as a dinner meeting, a golf outing, or other networking event on a computer network, such as the Internet, and directly or indirectly receive acceptances from prospective individual users.

Another aspect of the invention provides a method and apparatus which enables a plurality of inviting users to advertise or publish invitations at a single location, which is readily updated, such as a Web page or bulletin board, and accessible via a computer network, such as the Internet.

Other aspects as well as embodiments, features and advantages of the present invention will become apparent from a study of the present specification, including the drawings, claims and specific examples.

DETAILED DESCRIPTION

The invention relates to a computer-based method for arranging a meeting or other event between two or more users comprising:

(a) receiving a proposed invitation from an inviter (e.g., an invitation generated by the inviter); and (b) providing or displaying said proposed invitation information at a location accessible by one or more users.

Figure 1:
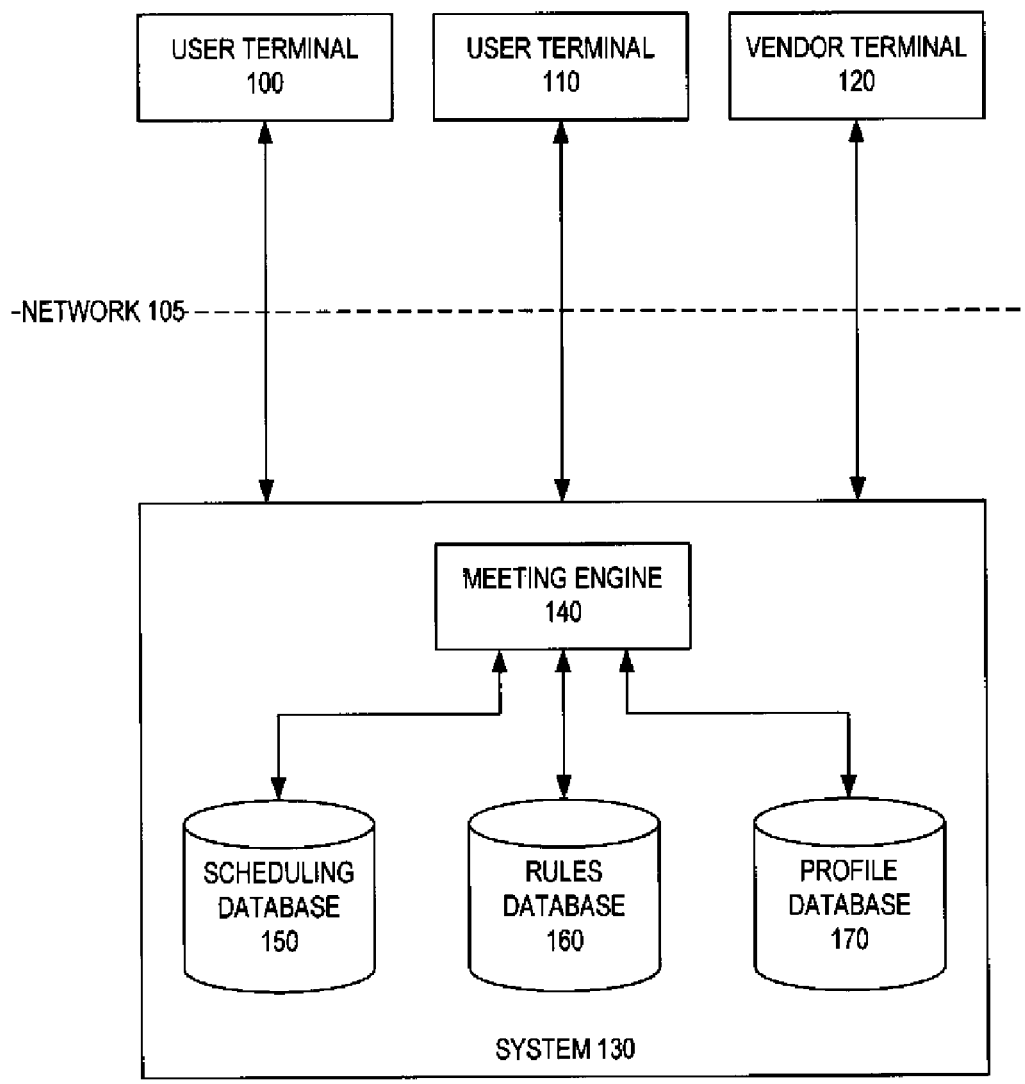
FIG. 1 is a block diagram that depicts a system architecture in accordance with an embodiment of the present invention.

FIG. 1 depicts a system architecture in accordance with an embodiment of the present invention. The architecture may include terminals operated by users (100,110) and/or vendors (120) in communication with the system (130) of the present invention, which may include a meeting engine (140) coupled with several databases that store invitation information (150), processing rules (160) and user/vendor profiles (170).

FIGS. 2-5 depict the application of rules by the meeting engine (140) of the system (130) in connection with invitation creation, acceptance, counterproposing and browsing.

Figure 2:
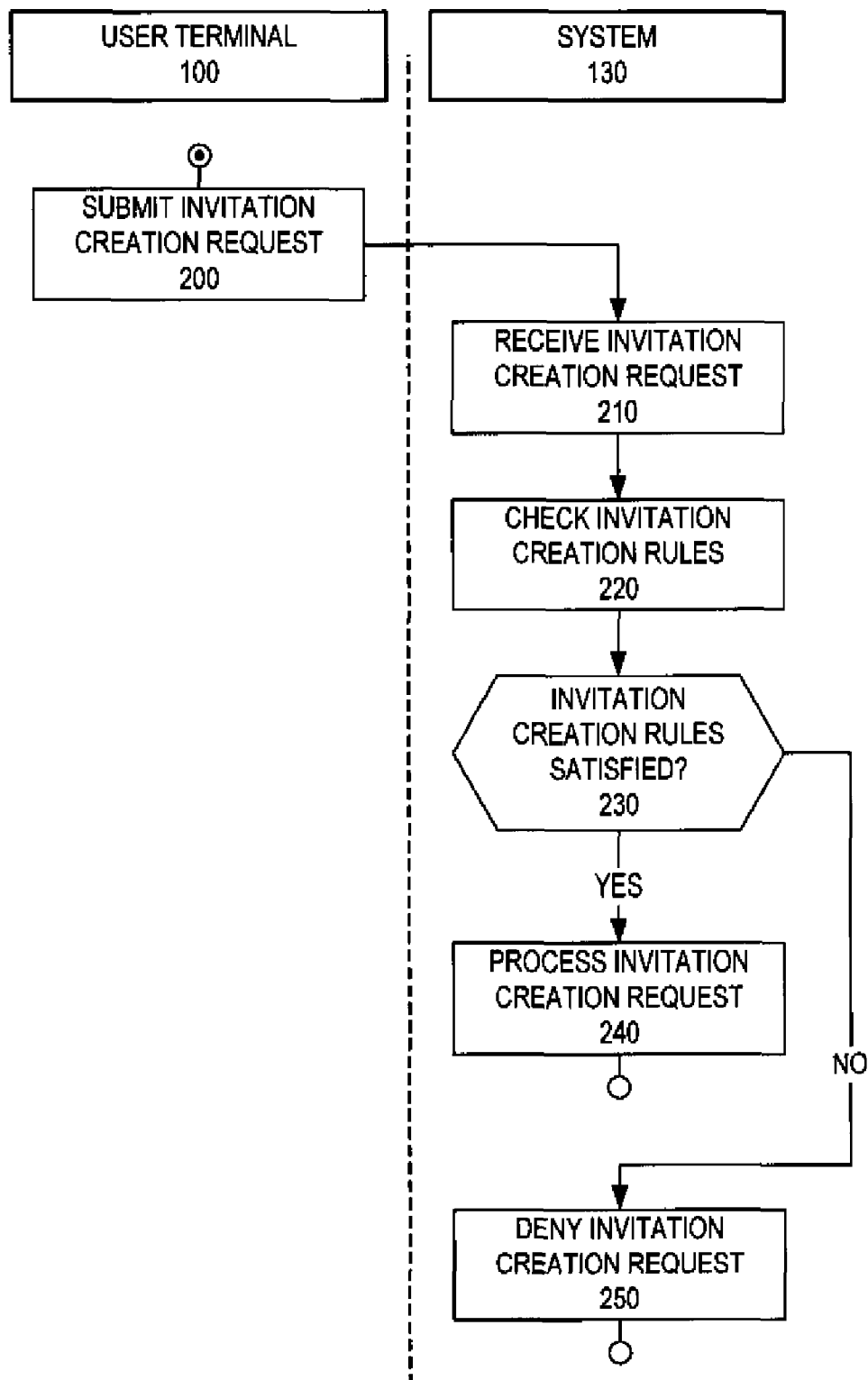
FIG. 2 is a process flow diagram for rule-based invitation creation in accordance with an embodiment of the present invention.
Figure 3:
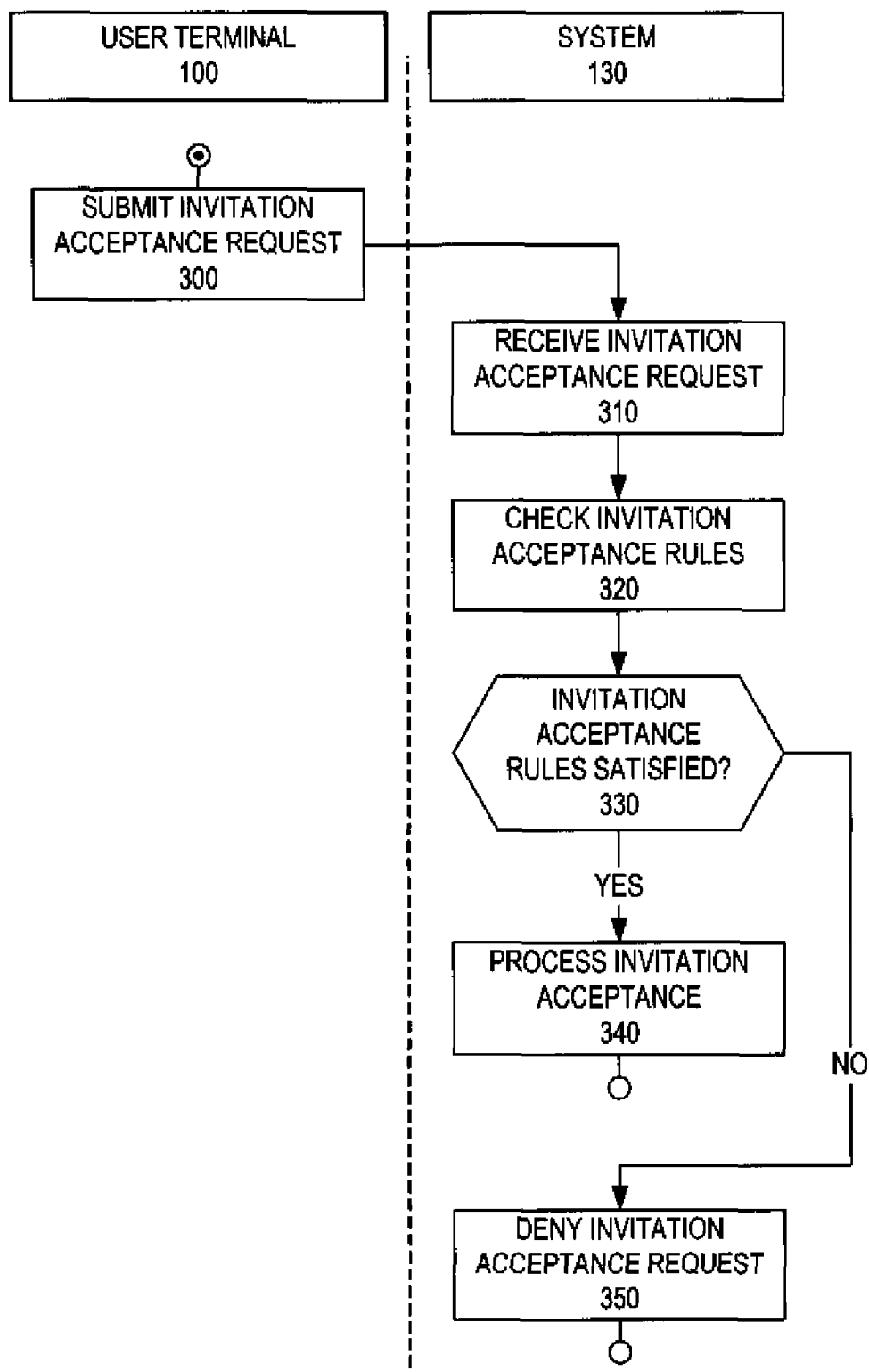
FIG. 3 is a process flow diagram for rule-based invitation acceptance in accordance with an embodiment of the present invention.
Figure 4:
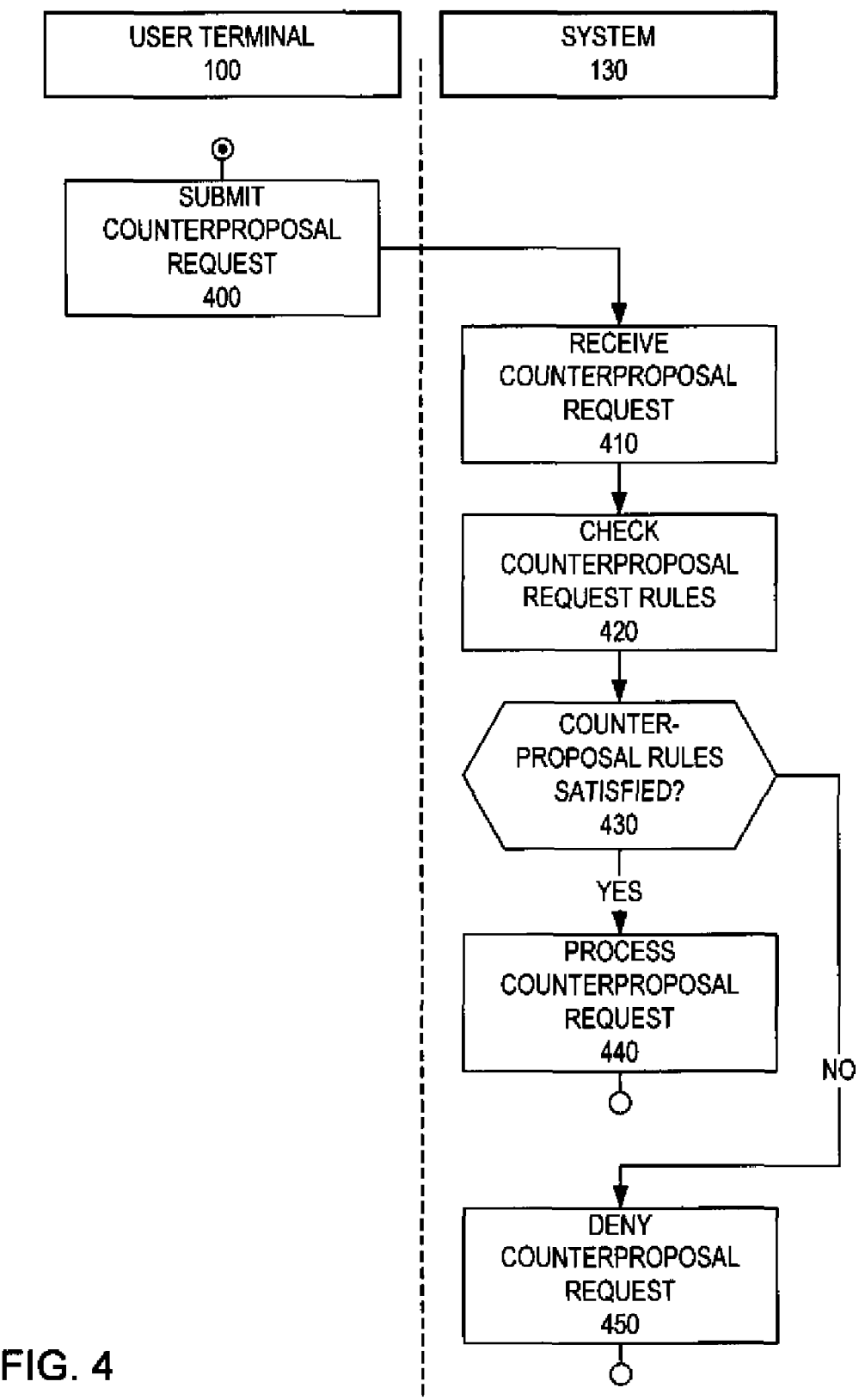
FIG. 4 is a process flow diagram for rule-based invitation counterproposing in accordance with an embodiment of the present invention.
Figure 5:
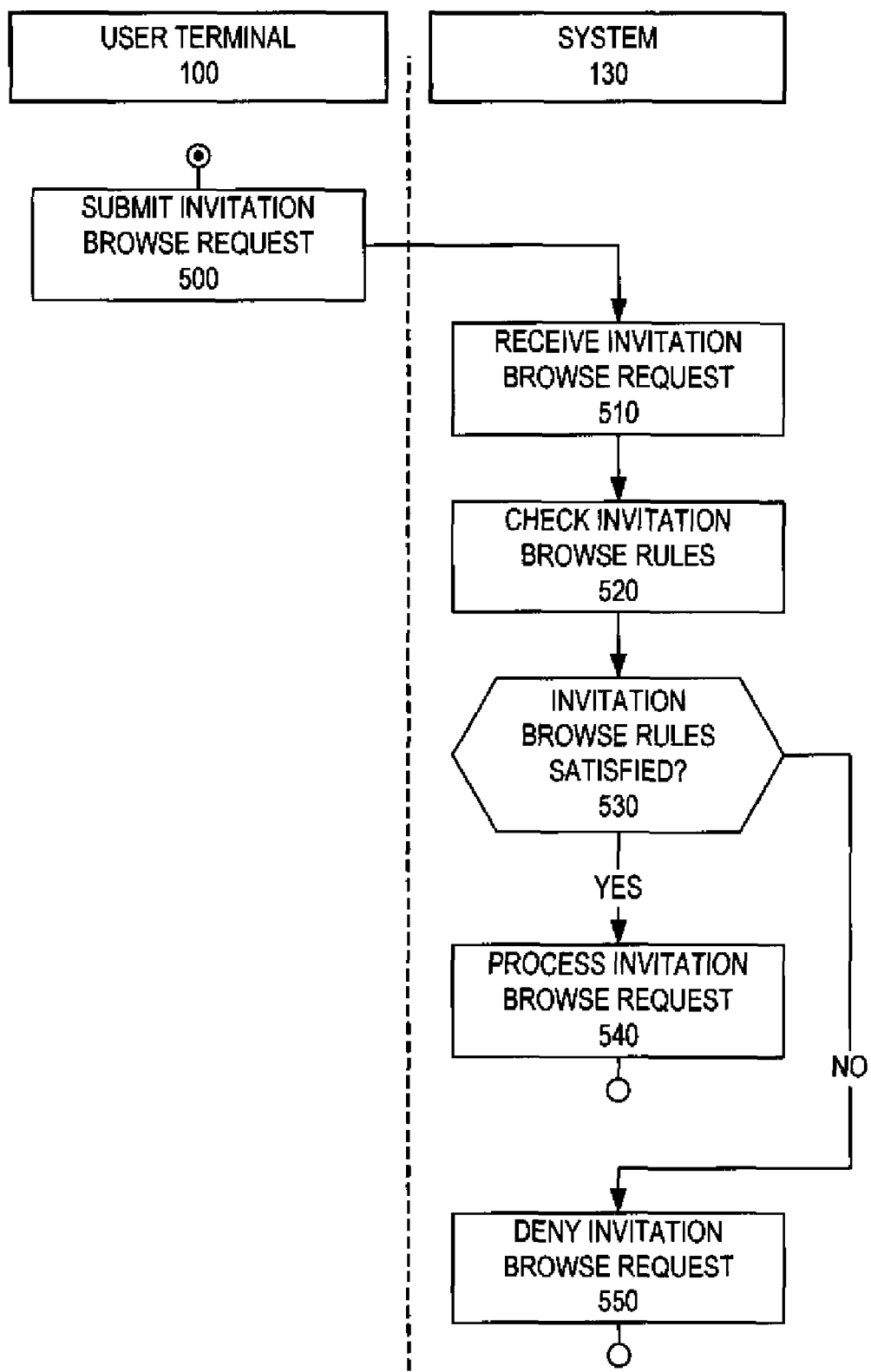
FIG. 5 is a process flow diagram for rule-based invitation browsing in accordance with an embodiment of the present invention.

In FIG. 2, a terminal (100) operated by a user submits (step 200) to the system (130) a request over a network (105) to create an invitation for a proposed meeting. The system (130) receives (step 210) the request and determines (steps 220, 230) whether one or more rules associated with invitation creation, such as those stored in a rules database (160), apply to the invitation creation request. The system (130) then processes (step 240) the invitation creation request if all determined applicable (e.g., required or necessary rules) rules are satisfied, and denies (step 250) the invitation creation request if any determined applicable rule is not satisfied. FIGS. 3-5 depict similar steps in connection with invitation acceptance, counterproposing and browsing, respectively. In FIG. 3, a terminal (100) operated by a user submits (300) a request to accept an invitation. The system (130) receives (step 310) the request and determines (steps 320, 330) whether one or more rules, such as those stored in the rules database (160), apply to the request to accept the invitation. The system (130) then processes (step 340) the invitation acceptance request if all the applicable rules are satisfied, and denies (step 350) the invitation acceptance request if any applicable rule is not satisfied. In FIG. 4, a terminal (100) operated by a user submits (400) a request to make a counterproposal to an invitation. The system (130) receives (step 410) the request and determines (steps 420, 430) whether one or more rules, such as those stored in the rules database (160), apply to the request to make the counterproposal. The system (130) then processes (step 440) the counterproposal request if all the applicable rules are satisfied, and denies (step 450) the counterproposal request if any applicable rule is not satisfied. In FIG. 5, a terminal (100) operated by a user submits (500) a request to browse for invitation. The system (130) receives (step 510) the request and determines (steps 520, 530) whether one or more rules, such as those stored in the rules database (160), apply to the request to browse for invitations. The system (130) then processes (step 540) the browse request if all the applicable rules are satisfied, and denies (step 350) the browse request if any applicable rule is not satisfied.

The rules described in FIGS. 2-5 may derive from preferences stored in profiles (170) associated with users and/or vendors affiliated with the system (130), security criteria, and other situations as described below for example.

Figure 6:
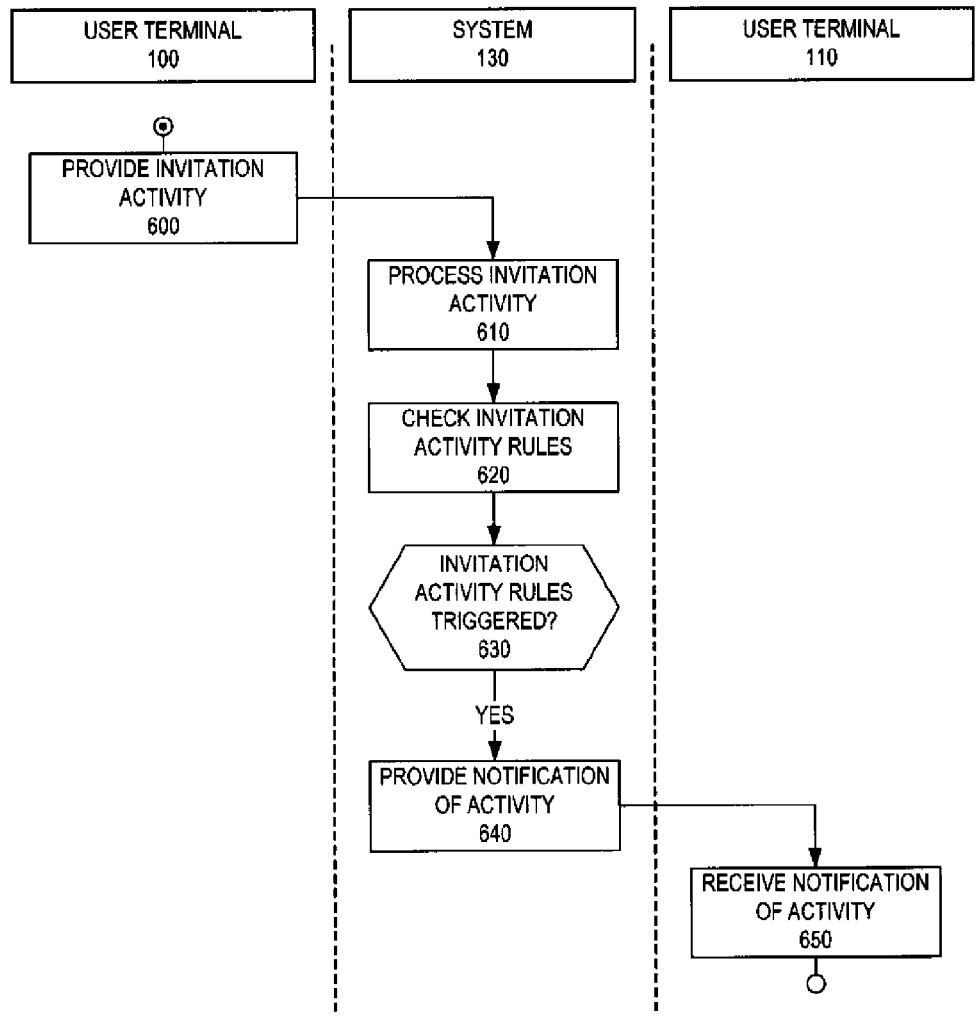
FIG. 6 is a process flow diagram for rule-based invitation activity notification in accordance with an embodiment of the present invention.

FIG. 6 depicts how a user of the system (130) may express a preference for and receive notification of invitation activity pertaining to invitations of other users that are not related to the inquiring user. Invitation activity may include the posting of an invitation or the acceptance of an invitation by another user, or the posting of an invitation having certain characteristics or keywords (e.g., any invitation for Web 2.0 programmers). For example, a user may wish to be notified when a certain other user (e.g., a user the first user wishes to meet or meet again) posts an invitation or accepts an invitation of another, in which case the first user may be notified so the first user can decide whether to participate in the same meeting.

In FIG. 6, a terminal (100) operated by a user provides (step 600) to the system (130) a request over a network (105) to process an invitation for a proposed meeting, which may include, for example, drafting, creating, editing, accepting, or counter proposing to the invitation. The system (130) processes (step 610) the request, and determines (steps 620, 630) whether the request applies to one or more notification rules set up by a different user unrelated to the processing of the invitation. For example, a notification rule can include a request that the user be notified if a specific user posts or accepts an invite and/or if an invite have certain characteristics is processed (e.g., specific keyword, location and/or meeting purpose). Preferably, the notification employs RSS. It then provides (step 640) to the different user (step 650) a notification in accordance with any determined applicable rule. The notification rules may also derive from preferences stored in profiles (170) associated with users and/or vendors affiliated with the system (130), and examples of such notification rules are provided below.

Figure 7:
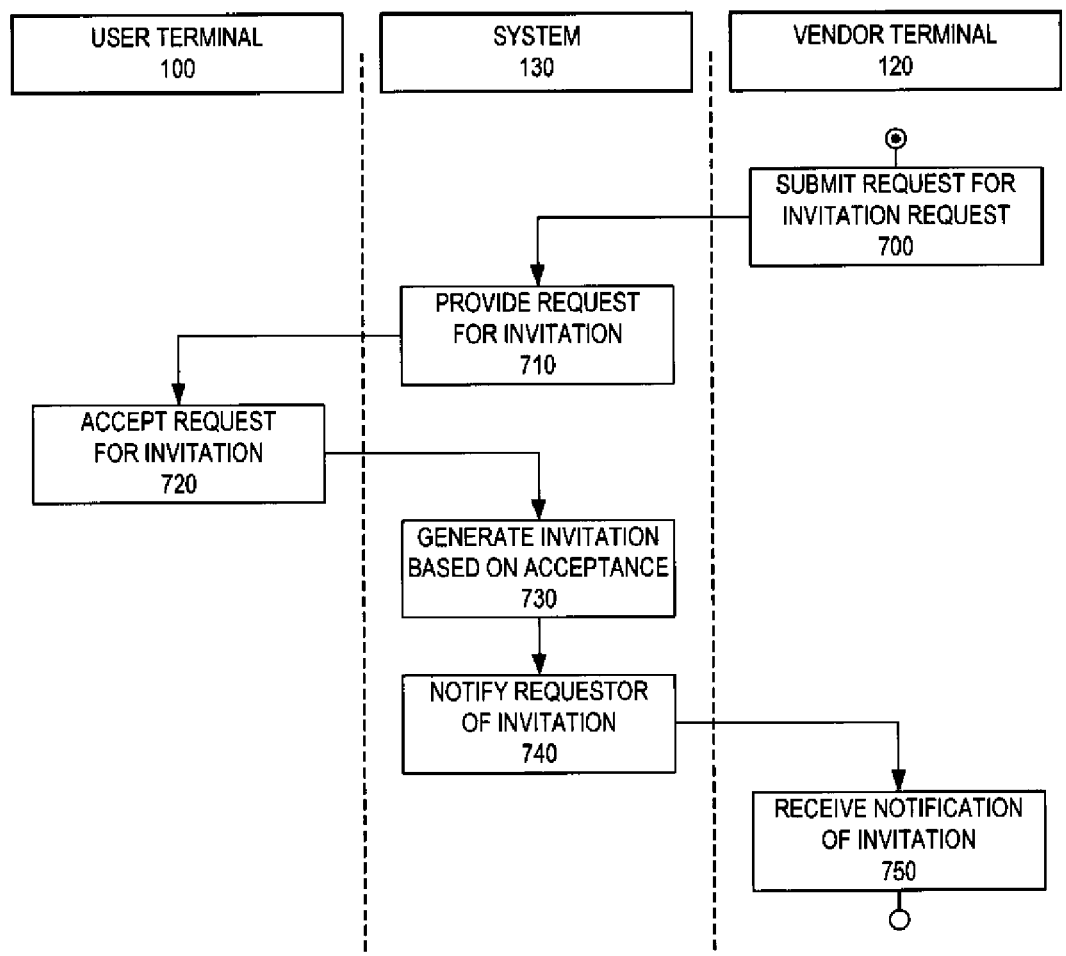
FIG. 7 is a process flow diagram for requests for invitations in accordance with an embodiment of the present invention.

FIG. 7 depicts how vendors may advertise by requesting invitations through the system (130). In FIG. 7, a terminal (120) operated by a vendor submits (step 700) to the system (130) a request over a network (105) for an invitation for a proposed meeting. The system (130) provides (step 710) the request for the invitation to other users. Responsive to a terminal (100) operated by a user accepting (step 720) the request for the invitation, the system (130) generates (step 730) the invitation for the proposed meeting, and notifies (step 740) the vendor (step 750) of the invitation. The initial request for the invitation provided to the other users may be in the form of an online advertisement such as banner ad, for example, as described below.

Figure 8:
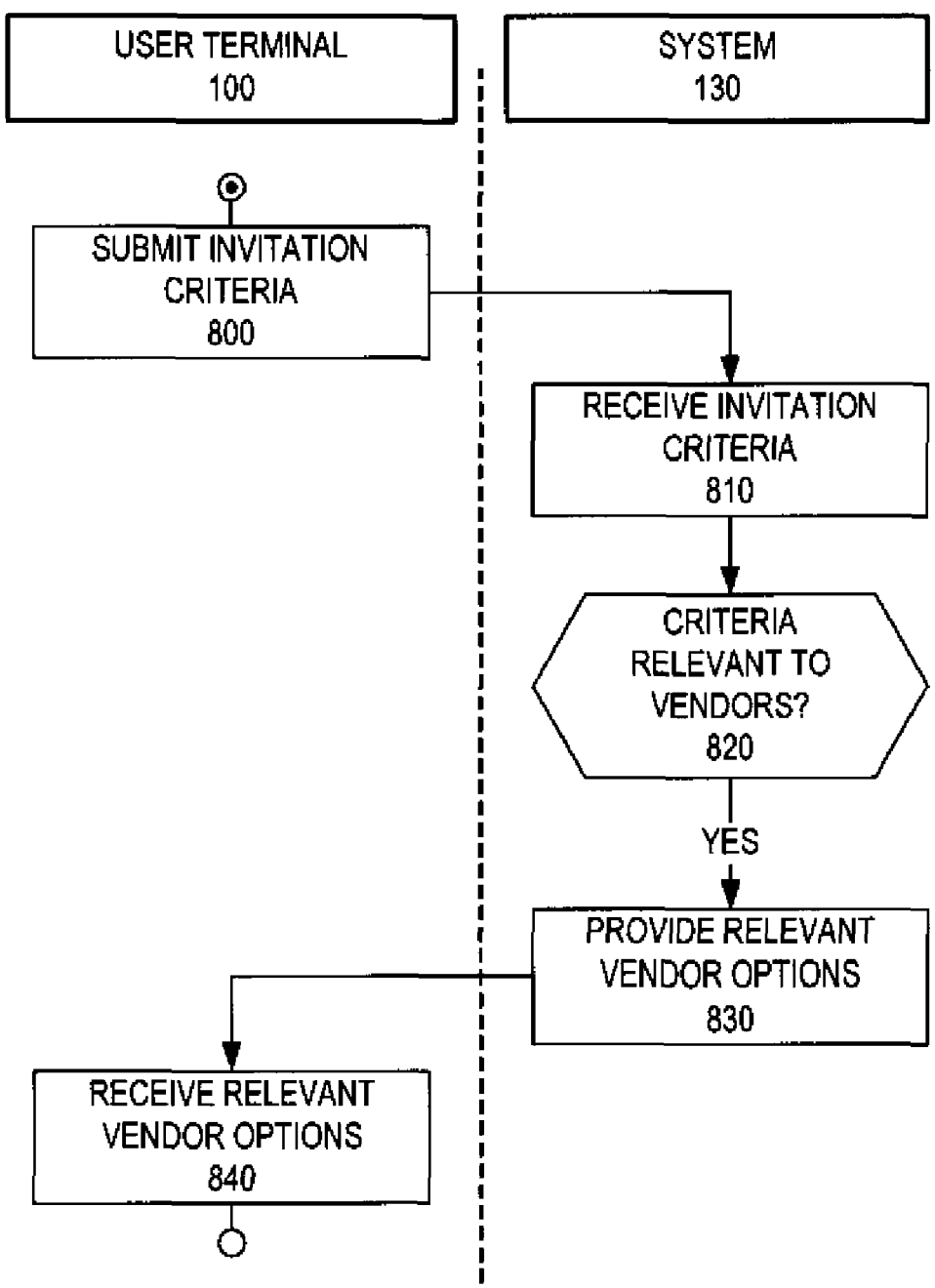
FIG. 8 is a process flow diagram for integrating vendor options into invitations in accordance with an embodiment of the present invention.

FIG. 8 depicts the integration of vendor (commercial user) service options into invitations. In FIG. 8, a terminal (100) operated by a user submits (step 800) to the system (130) criteria over a network (105) associated with an invitation for a proposed meeting. The system (130) receives (step 810) the invitation criteria and determines (step 820) whether it is relevant to one or more services provided by one or more vendors. The system (130) then provides (step 830) the user (step 840) with an option to select any of the determined relevant vendor services in connection with the invitation. Embodiments of this functionality are provided below. A vendor or commercial user is a user of the system who is seeking to sell or otherwise commercialize goods or services to other users of the system.

One aspect of the invention relates to improved electronic invitations, and methods and systems for generating and/or electronically publishing and/or otherwise transmitting (e.g., via email) such invitations.

According to one embodiment, the improved invitations include certain specified information relating to the proposed meeting in the invitation including one or more of the following: (a) time or time range for proposed meeting or open time (i.e., whereby an accepting user selects the time); (b) date or range of dates (e.g., any Monday-Friday during April) or multiple dates (i.e., any date the accepting user selects) or open date (i.e., whereby an accepting user selects the date) or recurring date (e.g., daily, weekly, month or a variety of available dates provided by the inviter); (c) location or approximate location (e.g., neighborhood, airport terminal, tradeshow or conference, etc.); (d) type of meeting (e.g., dinner, lunch, breakfast, drinks, golf, running/jogging partner(s), dog walking, card game or the like, etc.); (e) purpose of meeting (e.g., social networking, business networking, information seeking, business generation, romance, information or tangible exchange, product loan (e.g., cell phone power cord, etc.)); (f) minimum and maximum number of invitees; (g) invitee characteristics (e.g., inviter seeking to meet with certain people having certain background or profile), preferably with an indication of whether preferred or required; (h) inviter characteristics (e.g., inviter has a certain background and is seeking a meeting with individuals interested in learning about the inviter or information from the inviter); (i) payment obligations (e.g., inviter pays, invitee pays, third party will pay, or share costs); (j) invitation or event name; (k) detail description of meeting/event; (l) deadline for accepting invitation; (m) counter invitation limitations or guidelines (e.g., if and how other users can submit counter invitations proposing a change in time, place, etc.); (n) list of pre-selected invitees, if any; and (o) inviter's username. Preferably, the invitation may also include a deadline for showing up for the proposed meeting (e.g., "Doors will close at 7 pm sharp.").

Preferably, the proposed invitation comprises proposed invitation information including a time and place for a proposed meeting. Preferably, the system allows the inviter to input or post an invitation with the specified information (a)-(o) in the invitation.

According to one preferred embodiment, the invitations include at least the following information: (a) date or range of dates; (b) time or time range for proposed meeting; (c) location or approximate location; (d) type of meeting; and (e) purpose of meeting. According to another preferred embodiment, the invitations include at least the following information: (a); (c); (d) and (e) purpose of meeting.

According to another embodiment, the invitation includes at least the following specified information in the invitation: (a) date or range of dates; (b) time or time range for proposed meeting; (c) location or approximate location; and (g) invitee characteristics. According to another preferred embodiment, the invitations include at least the following information: (a); (b), (c); (d) and (h). According to another preferred embodiment, the invitations include at least the following information: (a); (c); (d) and (g). According to another preferred embodiment, the invitations include at least the following information: (a); (c); (d) and (h).

According to another preferred embodiment, the system allows the inviter to input at least the specified information (a), (b) and (c) in the invitation. According to another preferred embodiment, the system allows the inviter to input at least the specified information (a), (b), (c) and (e) in the invitation. According to another preferred embodiment, the system allows the inviter to input at least the specified information (a), (c) and (e) in the invitation.

According to another preferred embodiment, the system allows the inviter to input at least the specified information (a), (b) and (d) in the invitation. According to another preferred embodiment, the system allows the inviter to input at least the specified information (a), (b) and (e) in the invitation. According to another preferred embodiment, the system allows the inviter to input at least the specified information (a), (b), (d), and (g) in the invitation. According to another preferred embodiment, the system allows the inviter to input at least the specified information (a), (b), (d), and (h) in the invitation.

According to another preferred embodiment, the system allows the inviter to input at least the specified information (c), (d) and (e) in the invitation. According to another preferred embodiment, the system allows the inviter to input at least the specified information (c), (d), (e) and (g) in the invitation. According to another preferred embodiment, the system allows the inviter to input at least the specified information (c), (d), (e) and (h) in the invitation.

According to another preferred embodiment, the system allows the inviter to input at least the specified information (c), (d) and (g) in the invitation. According to another preferred embodiment, the system allows the inviter to input at least the specified information (c), (d) and (h) in the invitation.

According to another preferred embodiment, the system allows the inviter to input at least the specified information (c) and (h) in the invitation. According to another preferred embodiment, the system allows the inviter to input at least the specified information (c) and (g) in the invitation. Preferably, the invitations of such preferred embodiments further include (e).

According to another preferred embodiment, the system allows the inviter to input the specified information (o) username of inviter with at least either: (i) criteria (a), (b) and (c); (ii) criteria (a), (b), (c) and (d); (iii) criteria (c); (iv) criteria (c), (d) and (e); (v) criteria (h); (vi) criteria (g) and (h); (vi) criteria (c) and (j); (viii) criteria (c) and (k). Preferably, such embodiment also include criteria (n) list of participants.

According to another preferred embodiment, the system allows the inviter to input the specified information (h) inviter characteristics with at least either: (i) criteria (a), (b) and (c); (ii) criteria (a), (b), (c) and (d); (iii) criteria (c); (iv) criteria (c), (d), (e) and (g); (v) criteria (g); (vi) criteria (c) and (g); (vi) criteria (c) and (j); (viii) criteria (c) and (k). Preferably, such embodiment also include criteria (n) list of participants.

Preferably, the invitations include the inviter's username or characteristics, preferably allowing other users to review the inviter's profile.

Preferably, for the "purpose" of the meeting, the inviter is able to select from or include information relating to one or more of the following purposes or purpose categories: (a) "business-networking" (e.g., to meet with other individuals within the inviter's industry or within the inviter's profession for general business networking and contact generation); (b) "business—provide marketing/sales information" (e.g., to meet with other individuals to provide them with information about a product or service. For example, a trusts attorney may post an invitations to have coffee with individuals interested in learning about trusts and wills); (c) "business—receive marketing/sales information" (e.g., to meet with one or more individuals to provide you with information about a product or service. For example, post a meeting with a financial advisor to learn about investment strategies or with a patent attorney to learn whether your invention is patentable); (d) "Business—meet potential customer or vice versa" (e.g., inviter may be in sales or marketing and is interested in meeting with potential customers); (e) "Business—other"; (f) "Career Inquiry" (e.g., to meet with others to discuss a possible career. For example, meet with a high school teacher to learn about teaching high school.); (g) "Job Inquiry" (e.g., meet with current or former employees at a company you may be interested in working for); (h) "Social—networking" (e.g., make new friends and acquaintances); (i) "Social—hobby" (e.g., meet with fellow hobbyists such a fellow card players, bird watchers, gamers, etc.); (j) "Social—religious" (e.g., meet with others who share the inviter's faith); (k) "Social—political meeting" (e.g., meet with others who share political thoughts or learn from others who don't.); (l) "Social—Pro-sports fans"/"Social—College sports fans" (e.g., to rally with fellow fans at a favorite sports bar or at the hotel bar); (m) "Social—Alumni" (e.g., meet with other alumni from the inviter's high school, college or graduate school]; (n) "Social—same hometown" (e.g., to connect with users from the inviter's hometown); (o) "Social—Meet Town Newcomers"; (p) "Social—Intellectual Discussion" (e.g., inviter seeks to have an intellectual discussion with others to discuss one or more topics such as the civil war, theoretical physics, finance, etc.); (q) "Romance" (e.g., inviter seeks a meeting that is romance or romance-like); (r) child playdate (e.g., post an invitation for a play date at a local park for your kids); (s) exchange or borrow or loan a tangible or intangible product; (t) other.

Preferably, the inviter can create any one of the following types of invites: (i) a "private" invite—a meeting where the invite is not published but instead only transmitted to and/or viewable by specific invited guests, preferably invited by providing each guest's email address and/or username so an invite can be sent directly to each person; (ii) a "targeted" invite—a meeting where the inviter invites either specific guests, such as friends (e.g., by providing their usernames and/or email addresses) and/or people that meet certain "criteria" (e.g., University of Michigan alumni in New York) and where the invite will be published and viewable by anyone browsing the Website; and (iii) an "open" invite—a meeting where there is no criteria for guests and no specific persons identified to invite but will instead be published on the internet (e.g., on a website) and viewable and acceptable by any individual using the Website.

According to preferred embodiments of the invention, the inviter or meeting organizer may "approve" or "decline" another user's acceptance of the invite. Preferably, the inviter is required to approve or decline each acceptance from a user who was not pre-selected by the inviter. For example, if someone accepted the invite whose background did not fit the invitee characteristics set forth in the invite, the inviter can "decline" to have that person join the meeting. Preferably, the inviter can "decline" an acceptance for any reason. This allows the inviter to control who attends the inviter's meeting, even if the invite is published. According to one preferred embodiment, the system would send an email to that person informing him that the inviter declined, and that he may not attend your meeting or, alternatively, send emails confirming the meeting to anyone who has accepted and been "approved" by the inviter. According to another embodiment, if a specific person is invited to attend a meeting, the inviter would not need to "approve" that person's acceptance in order for that person to receive confirmation that he may attend the meeting since the system will assume that if the inviter has specified someone to invite, the inviter would not have any reason to decline that person's acceptance.

According to another embodiment, the inviter is able to post an invite where the time and/or date is left open such that the invitation stays open until the designated number of users accept (and the users may than choose a time and date) or until a first accepting user proposes a time/date. That is, the inviter posts an open invitation and the proposed time is selected by the accepting user and then confirmed by the inviter. For example, a resident in New York may post an open invite to meet with any individuals who graduated from same school or post such an invite and designate certain days of the week as being preferred (e.g., invite is for dinner any Tuesday or Thursday of any week). According to one preferred embodiment, the inviter can post a recurring invitation where multiple available recurring dates are provided (e.g., daily, weekly, monthly, any weekday, or random dates selected by the user) which allows other users to accept the invite for any of the dates provided. Preferably, the inviter receives a notification when a proposed date has been selected by another user. Preferably, the inviter may confirm the inviter's continued availability for the date selected by the other user, and preferably, a notification of such confirmation is transmitted to such other user. For example, a first user may post a recurring invite for dinner at 7 pm for any future Monday. A second user reviewing the posted invite will see that the invite date is any future Monday and can accept any of those open dates for a meeting, preferably the open dates are displayed in a calendar and the user can accept any highlighted date. Preferably, the inviter is then notified that a date has been selected and is provided with the option of approving the acceptance thereby confirming the inviter is available for that date and also confirming he or she wishes to meet with the accepting user. According to one embodiment, the invitation with recurring dates continues being open to future acceptances for the future open dates even after a first date is accepted and confirmed. According to an alternative embodiment, the invitation is closed after a first date is accepted and confirmed. Preferably, the inviter is provided with an option to have the invite continue or close after the first confirmed acceptance. According to one preferred embodiment, once a recurring invite is accepted and the accepted date confirmed by the inviter, it is identified as a confirmed meeting to other users browsing invites.

According to another embodiment, the inviter can post an invitation with the specific location open so that the accepting user can propose the specific location (e.g., propose a specific restaurant when accepting the invitation). For example, the inviter may post an invite with only a general location (e.g., city, zip code, neighborhood, etc.) and the accepting user may propose a specific location.

According to another embodiment, the inviter may include only a general location in the posted invite while withholding the specific location whereby the specific location (e.g., specific restaurant) is disclosed only to accepting users who have been confirmed by the inviter. Preferably, the specific location of the meeting is emailed to the confirmed accepting users and/or viewable via a website by the confirmed accepting users. This will allow the inviter to limit or control who shows up at the proposed meeting to only those accepting users who the inviter has confirmed or approved since the specific location of the meeting will only be disclosed to those users. According to one preferred embodiment, the inviter has the option to mask or withhold one or more aspects of the invite including: (a) meeting date; (b) meeting time; (c) meeting specific location; (d) meeting purpose; (e) inviter; (f) confirmed accepting users; and (g) combinations there of Preferably, such masked or withheld information is forwarded to confirmed accepting users via email or made viewable to such users.

According to another preferred embodiment, the inviter is able to include a deadline for accepting the invitation and/or deadline for arriving at the meeting (e.g. "doors close by 8 pm") to provide other users with notice of such deadlines.

According to one embodiment, the one or more users are anonymous in that the user posting the invite ("inviter" or "inviting user") does not previously know the one or more users accepting the invitation ("acceptor" or "accepting user"). For example, the users may all be anonymous users. The term "anonymous" as used herein is intended to refer to anonymity between the two or more parties. One form of anonymity involves "shielded identity", where a trusted agent knows the identity or personally identifiable information (e.g., email address) of the two or more parties, but does not reveal that identity to others except under specified circumstances. Unless otherwise specified, the term "anonymity" is used throughout this application interchangeably with the notion of shielded identity. See, U.S. Pat. No. 6,023,510 to Epstein; U.S. Pat. No. 5,884,272 to Walker et al; U.S. Pat. No. 5,958,007 to Lee et al.; U.S. Pat. No. 5,884,270 to Walker et al.; and U.S. Pat. No. 6,012,046 to Lubien et al. According to preferred embodiments of the invention, the system or method provides users with "shielded identity" anonymity in that the system knows the user's name or contact information (e.g., email address), but this information is not available to other users. According to other preferred embodiments, the users are not anonymous (e.g., their names or other personal identifiable information is disclosed in their profiles), but the users did not previously know each other.

According to another embodiment, the inviter can invite one or more known individuals or pre-selected users to the proposed meeting as well as post the invitation for acceptance by anonymous users or non-preselected users. For example, the inviter may select one or more specific pre-selected users to receive notifications (e.g., via an email) of the invitation before, after or while the invitation is being posted for review and acceptance by anonymous or other users. Preferably, the pre-selected user will receive a notification (e.g., via email) of being pre-selected as an invitee for the proposed meeting. Preferably, the pre-selected user may accept the invitation, decline the invitation or save the invitation (e.g., to decide later whether to accept or decline). Preferably, the pre-selected user is provided with the option to view the content of the invitation prior to making a choice. According to one preferred embodiment, the pre-selected users are not registered users and are required to register prior to accepting or viewing the invitation. According to another preferred embodiment, the inviter has the option to delay the general posting of the invitation for a period of time after the invite was sent to the pre-selected invitees and/or wait until all the pre-selected invitees have accepted or declined the invitation. Preferably, once the pre-selected invitee accepts an invitation, no further confirmation is required by the inviter to confirm the meeting.

According to another embodiment, users are capable of posting "closed" or private invitations where all the invitees are pre-selected. Preferably, such "closed" invitations are not posted on the public invitation bulletin, preferably at the option of the inviter. Preferably, the inviter may indicate the invite is "closed" to all other users except those other users who have one or more specified characteristics (e.g., profile describes a fellow alumnus, paying subscriber, etc.). According to another embodiment, only such users having such characteristics can view the invite and/or have the invite included in their search results when searching for invites. According to a preferred embodiment, the inviter is able to keep portions of the invite "closed" or "masked" rather then the entire invite. For example, the inviter may post a meeting with only a general location (e.g., zip code, city, and/or neighborhood) where the specific location is only disclosed to those users who are confirmed participants (e.g., either pre-selected or confirmed acceptors) and/or users having specified characteristics.

According to another embodiment, the inviter can select an option to include invitee information or additional inviter information in the invitation, such that as users are pre-selected or accept the invitation, such users become listed in the invitation as meeting participants. According to another embodiment, the confirmed participants are automatically listed in any published invite once confirmed as participants. According to another preferred embodiment, the accepting user is provided with the option to not be listed in an invite. That is, the accepting user may accept and become an approved meeting participant without the user's username and/or profile information being viewable via the invite. Preferably, the invite indicates there is a confirmed user but does not disclose the username and/or profile information.

Another embodiment of the invention relates to improved invitations including invitee characteristics where the inviter can describe the types of individuals the user wants to meet with. For example, the inviter may include a requirement or preference that invitees have certain characteristics (e.g., work in a certain industry, graduated from certain school, have a specified profession, etc.). Preferably, the inviter is provided with the option to make one or more of the invitee characteristics required, preferred or combinations thereof (e.g., one characteristic may be required, while another is preferred). Preferably, other users who do not have the specified characteristics in their profile cannot view such invites.

According to one embodiment, the user is further able to select one or more of the following invitee characteristics or characteristic categories: (i) profession (e.g., sales, marketing, legal, etc.); (ii) industry (e.g., biotech, semiconductors, media, etc.); (iii) current employer; (iv) past employers; (v) schools attended/graduated (e.g., grade school, high school, college, graduate school, etc.); (vi) professional or social associations (e.g., ABA, AIPLA, Elks, MADD, etc.); (vii) fraternity/sorority; (ix) favorite sports team (pro and/or college); (x) hobbies; (xi) political party; (xii) hometown—current (e.g., inviter is moving to town and seeking to meet with current residents to obtain information about the town); (xiii) hometown-past (e.g., inviter seeking individuals who used to live in town); (ixx) hometown—childhood (e.g., inviter seeking individuals who grew up in town); (xx) military service/branch; (xxi) past or present medical condition (e.g., if inviter wishes to meet with other survivors or individuals diagnosed with same illness to share information and support); and (xxii) any other invitee characteristic.

According to one embodiment, the user may select combined options relating to desired invitees. For example, the user may be able to describe an invitee as someone who is (1) an attorney and (2) a graduate of University of Virginia law school. According to another embodiment, the user may select alternative characteristics. For example, the user may be able to describe an invitee as someone who is (1) an attorney or (2) a graduate of University of Virginia. Thus, an invitee meeting either characteristic would be a suitable acceptor. Preferably, users can do both. Preferably, accepting users are ranked or categorized for the inviter's review based on whether the accepting users satisfy one or more of the specified characteristics.

According to another embodiment, the invitation includes the inviter's characteristics or background in the invitation, such as the invitee characteristics or characteristic categories (i)-(xxii). For example, the inviter may be a certified financial planner and be interested in meeting with potential clients and thus include that information in the invitation. As another example, the inviter is a trust & estates attorney interested in meeting with potential clients to discuss estate planning options and related matters. Thus, the invitation may describe the inviter and request invitees interested in meeting with the inviter. Preferably, the inviter's username is associated with the invitation and the inviter's pubic profile with the username for review by other users. Preferably, the inviter is provided with a personal home page containing the user's profile information or a link to such information. Preferably, the user can designate certain profile or user information to be posted or associated with the invite so can be reviewed by potential acceptors. According to a preferred embodiment, the user's public profile page may contain a link to an external profile (e.g., the user's profile from another site).

According to one preferred embodiment, the user's personal homepage or dashboard includes (or includes a link to): (i) personal profile information; (ii) a calendar or list of past or future or upcoming meetings; (iii) past meeting participants; (iv) past meeting locations; (v) the user's ratings and/or comments regarding past meeting participants and/or past meetings and/or meeting locations; (vi) a list of pending invitations, pending acceptances and username contacts developed using the same; (vii) saved or wish list invitations posted by other users; (viii) draft invitations prepared by the user, but not yet finalized and posted; (ix) the user's rating by other users or comments regarding the same.

According to one embodiment, the homepage may include the user's meeting history and meeting calendar and also keep a record of statistics relating to an individual user such as total number of invitations posted, accepted or confirmed by the individual user, total number of meetings individual user participated in and/or list of any such meeting (including when and where such meetings occurred) and total number and/or list of other users the individual user has communicated with, whether at a meeting or via intrasystem mail. Preferably, such information is provided on the user's personal page.

Preferably, the user is able to insert notes regarding meetings, meeting locations or participants or other users at such meetings.

According to preferred embodiments of the invention, the system allows the user to set one or more reminders relating to invites, preferably received via email or other electronic transmission. Preferably, the user can set two or more reminders, wherein at least one reminder includes the location of the upcoming meeting, a list of participating users (or their usernames) or combinations thereof Preferably the user can customize reminders for each invite and/or set a default set of reminders for each invite. For example, a user may wish to set two different reminders for an upcoming coffee meeting. The first reminder simply notifies the user of the upcoming meeting twenty-four hours before the meeting, while the second reminder is sent one hour before the meeting and includes the location of the meeting, directions to the meeting, and a list of participants.

According to additional preferred embodiments, the system allows a user to transmit an email or other electronic transmission to the system and automatically receive requested information, preferably time and/or location information for an upcoming meeting. For example, a user needing to recall the specific address of an upcoming meeting can email the system with a simple message such as "location today's meeting" and will automatically receive the requested information.

According to additional preferred embodiments, user invites, both invites posted by the user and invites where the user was a meeting participant, are automatically archived for the user. Preferably, after the meeting, the user receives an email or other notification requesting comments and/or ratings relating to the meeting, the meeting venue, and/or meeting participants. Preferably, the user can also add and modify comments after the invite is archived. This feature will allow the user to post comments such as whether the restaurant was enjoyable, notes about meeting participants (e.g., where they worked, what they were like, their interests, their birthdays, spouse's or children's names, etc.). Preferably, the user can also retrieve any archived invite and reuse as a template for a new invite where the only required change would be the date of the new meeting. Preferably, the user is provided a clickable button on the user's dashboard to view and/or search for archived invites. According to one preferred embodiment, the system transmits the archived data (e.g., via email attachment or via downloadable format) to users on a scheduled basis (e.g., daily, weekly, monthly or yearly) or at the request of the user, preferably the system deletes such transmitted data after transmission to conserve space on the system. According to another preferred embodiment, one or more portions of the archived data (e.g., ratings or comments regarding meeting venues) are collected and aggregated for public review thereby enabling ratings or comments regarding venues, meetings or participants to be made publicly available. Preferably, the data is made public at the user's option. Preferably, the username is not associated with the published data.

Preferably, the user's homepage or dashboard includes information relating to or lists of the other users the user has either met with or is interested in meeting with. According to one preferred embodiment, a user may request to be notified (e.g., via email) if a particular user posts an invitation or has accepted another invitation or if a certain type of invitation has been posted. For example, a user may live in NYC and want to be notified if any dinner invite is posted involving business-networking for corporate attorneys. As another example, the user may wish to be notified if an invitation is posted or accepted by another specific user.

According to other preferred embodiments of the invention, the system further allows users to establish a notification rules based on the location of the user, preferably the location determined or tracked via an electronic wireless device such that the user is notified of meetings with locations proximate the user's location. Preferably, users may text their location to the system, which then notifies them of any upcoming nearby meeting invites. Preferably, the user can set a radius of coverage (e.g., anything within 1 mile, 10 miles, etc.). Preferably, the user can limit the notifications to those proximate meetings having certain specified characteristics (e.g., if a particular user posts an invitation or has accepted another invitation or if a certain type of invitation has been posted). For example, the user may be a financial planner and wish to be notified if there is any invite posted for a meeting within five miles of the present location of the user, within the next week, and having any one or more of the keywords "retirement or financial planning or 401(k)". Thus, if another user posts an invitation to have coffee to discuss retirement planning issues and the location of the proposed meeting is within five miles of the first user, the first user will be notified. See, for example, US Patent Publication 20050177614 by Bourne, hereby incorporated by reference, for similar social and business networking methodologies utilizing mobile devices carried by users. The present invention distinguishes from Bourne since the notifications are based on the location and time of a proposed meeting, and preferably also the characteristics of the invite, rather than being based on a user's profile. The wireless device can include a cellphone, pager, a personal digital assistant (PDA, e.g., with GPRS NIC), a mobile computer with a smartphone client, a carphone or auto GPS device, or the like. A typical mobile device is a wireless access protocol (WAP)-enabled device that is capable of sending and receiving data in a wireless manner using the wireless application protocol. The wireless application protocol ("WAP") allows users to access information via wireless devices, such as mobile phones, pagers, two-way radios, communicators, and the like. WAP supports wireless networks, including CDPD, CDMA, GSM, PDC, PHS, TDMA, FLEX, ReFLEX, iDEN, TETRA, DECT, DataTAC, and Mobitex, and it operates with many handheld device operating systems, such as PalmOS, EPOC, Windows CE, FLEXOS, OS/9, and JavaOS. Typically, WAP-enabled devices use graphical displays and can access the Internet (or other communication network) on so-called mini- or microbrowsers, which are web browsers with small file sizes that can accommodate the reduced memory constraints of handheld devices and the low-bandwidth constraints of a wireless networks. In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. In an illustrated embodiment, mobile device users use SMS, which is a text message service that enables short messages (e.g., generally no more than 140-160 characters in length) to be sent and transmitted from a mobile device.

Preferably, users can adjust their account settings, profile and/or invite characteristics so as to block certain users or certain types of users (e.g., users not having specified profiles, rankings etc.) from accepting an invite, reviewing an invite or communicating with the user. According to one preferred embodiment, the user can block other specific users or classes of users (e.g., to block users who are marketing, selling or recruiting).

According to another preferred embodiment, the system provides for different membership levels. For example, this may include a free membership and a paying membership. Preferably, paying members can post invitations that can only be accepted by and/or viewed by other paying members. Preferably, such posted invitations would not occur in the search results of nonpaying members. One advantage would be to allow users enhanced quality control by allowing only paying members to accept meeting invitations thereby excluding spam acceptances or the like. Preferably, members have certain characteristics in their profiles can similarly restrict the acceptance, viewing and locating of their invites by users not having those characteristics in their profiles.

According to another embodiment of the invention, the system allows the user to maintain a personal profile database on the user's personal homepage (e.g., "MyProfile" or "PersonalProfile" page). Preferably, the user is able to designate the user's profile or other information as having different levels of public accessibility and/or having different limitations on how the information can be used. For example, the personal profile may include a public profile containing public information which may be disclosed to other users on the system (e.g., industry or profession, education, hometown, etc.) and a private personal profile (e.g., current employer, past employers, full name, etc.) which is not made available to the other users or only made available to certain users. Preferably, a user can designate certain limitations on part or all of the personal information on their "my profile" page and preferably later change such designation(s). For example, the user is preferably provided with the following privacy designations or designation categories: (a) public information (e.g., any user can see), (b) shielded information only viewable by certain users (e.g., registered users, users having disclosed similar information, users the user has previously met with, or users the user is scheduled to meet with); (c) private (e.g., no other users can see), etc. Preferably, the user can also select certain use limitations relating to the information such as (a) no limitations on use; (b) can use for system notifications/updates; (c) can use for commercial purposes (e.g., for targeted ads, promotions); (d) can commercially sell or license to third party.

According to one preferred embodiment, the system allows the individual to initially answer a number of questions or input menus about himself or herself to construct the individuals profile for their personal webpage.

The public or private profile may also include the personality traits of the user to increase the likelihood of a good match between users (e.g., brief description of self, favorite book/movie, latest book read, astrological sign, famous personality most alike or compared to, pet peeves, political beliefs, religion, etc.). The personal profile also preferably includes a private profile containing private information which is preferably not shared with other users. Additional information, preferably private information, may include the following: the sex of the individual; home and/or business address and telephone number; home and/or business email address; credit card and/or debit card number and information (e.g., for payment of any fees or deposits); name of employer; past product purchases, potential future product purposes, favorite brands, least favorite brands, etc. Preferably, the user is able to designate or change the designation of such information, individually or collectively, to have different levels of privacy and/or different levels of use limitations.

One purpose or advantage of a private profile portion would be to maintain user information confidential for administration purposes only (e.g., charging fees, etc.) and/or "quality control" (e.g., proper invite postings and acceptances).

An additional advantage would enable users to avoid inappropriate or unintended meetings such as those which may make the user uncomfortable. Thus, another aspect of the invention relates to systems and methods wherein the type of invitation or the type of criteria in an invitation a user may post as an inviter or accept as an acceptor will depend on the user's profile (herein "profile rule"). One preferred embodiment relates to a system and method whereby the inviter cannot create an invitation with a certain invitee requirement without having certain complying information in the inviters profile page. For example, although the intent of the system and method of the invention is not to provide a "dating service" and thus the gender of the users should be irrelevant, there may be legitimate reasons why a user wishes to meet only with individuals of a certain gender. For example, if the inviting user is a female and wishes to have a networking dinner with one or more individuals, the user may wish to meet with only females for safety or other reasons (e.g., is traveling in a foreign city). Preferably, the system allows the female user to post an invitation that includes "females only" in the criteria. Alternatively, the system may provide that such an invitation may be review and/or accepted only by members who are females. At the same time, the system would preferably not allow a male to post a "females only" invitation disguised as a female if his private profile indicates his gender as male. Another example would be an inviter not being able to post an invitation for Yale alumni unless the inviter's profile page indicates the inviter is also a Yale alumnus or another Ivy League school. Preferably, there are appropriate exceptions to any rule. For example, an inviter may post an invitation for meeting with Columbia University alumni even if the inviter is not an alumnus of that school, if the inviter's profile is designated as an applicant to the school or the invitation's "purpose" is indicated as being for obtaining information about the school as a prospective applicant to the school. Similarly, a user cannot create an invitation for GE only employees unless the inviter's profile indicates also a GE employee (for intra-company networking) or the invitation is posted by a prospective employee for the purpose of learning information about GE from current employees or is posted by someone within GE's industry (or a sales/marketing person who services the industry) and the invite includes an appropriate purpose.

According to another embodiment, the more information the inviter or user provides in the user's "profile" page, the more flexibility in creating invitations and accepting invitations. One embodiment relates to the use of a profile page where the user can optionally fill out certain fields (e.g., profession, salary, net worth, gender, political affiliation, employer, former employers, etc.), however, failure to fill out the questions prevents the user from posting an invitation with such required characteristics or accepting an invitation which has such characteristics.

Preferably, a user registers and constructs the personal profile by supplying information in various fields on a form (e.g., a Web page) supplied by the server to the user. After filling such fields, the user is prompted with an option to post an invitation or review posted invitations (discussed below).

In one embodiment, the individuals can register only once to prevent the creation of multiple profiles for a single individual. Preferably, it is possible to change existing information in the personal profile. Preferably, the information cannot be changed very often, because this would unnecessarily complicate operation of the system. In one embodiment, the number of times information may be changed by residents is limited to once a month, for example.

According to one embodiment, posting an invite on the invitation board is only possible if the "inviter" is registered and therefore has his or her own personal web page and/or personal profile.

Another aspect of the invention relates to improved systems and methods for posting, accepting, and confirming meetings, wherein the inviting user is allowed to generate an invitation that allows certain responses from the other users.

According to one embodiment, the inviter has the option to designate the invitation as allowing for counterproposals from other users (e.g., propose different time or place). If the inviter chooses not to allow this option, the other users would not be allowed to counterpropose, instead they can only accept the invitation "as is".

According to another embodiment, the original inviter would allow certain specified counterproposals (e.g., allow for different time, but not different location). For example, the counterproposals could be limited to changes to the proposed time or allow for a window of time for counterproposals or change in the proposed number of invitees (e.g., the invite requests only three invitees, but an interested user had four acquaintances who would like to attend). As another example, the inviter could allow for counterproposals relating to the specified location for the meeting (e.g., a different restaurant), specified cuisine for dinner meeting (e.g., propose Asian cuisine rather than French cuisine).

According to one preferred embodiment, the inviter is able to specify that only users having certain user profiles are allowed to counterpropose an invite or allowed certain types of counterproposals. For example, a preselected user or a user closely fitting the invitee criteria in the invitation may be allowed to counterpropose, while other users may not. In making a counterproposal, the user may change one or more attributes of the invitation. If the author of the invitation does not accept the counterproposal, the author of the counterproposal, upon being notified that the counterproposal was not accepted, may be given the option of generating a new invitation based on the counterproposal. That is, the new invitation may inherit one or more attributes (e.g., time and/or location) from the counterproposal that was not accepted.

Another aspect of the invention relates to improved systems and methods which allow individuals to post invitations on a computer-based network for review and acceptance by other users. Preferably, the user has the option to post an (i) open invite (preferably with the option to require approval of any RSVPs or acceptances); (ii) targeted invite either describing the types of individuals the user wants to meet and/or the specific individuals the user wants to meet; or (iii) private invites that are not published on the website but are instead directly sent to or viewable by specific individuals and/or users having certain characteristics (e.g., set forth in the user's profile).

According to one embodiment, a user reviewing the invitation is provided with the option to accept the invitation or place on watch or wish list for later consideration. Preferably, when the accepting user accepts an invitation, a notification (e.g., email) is sent to the inviter informing the inviter that a particular user has accepted the inviter's invitation. According to one preferred embodiment, the acceptor's acceptance of the invitation forms the meeting. According to another, the original inviter is required to confirm, approve or accept the acceptance to confirm the meeting with that user (preferably a notification is then forwarded to the accepting user confirming the meeting), decline the acceptance (in which case the accepting user preferably receives a notification that the user's acceptance was declined) or place the acceptance on hold for a decision (e.g., accepting/confirming or declining) at a later time. According to one preferred embodiment, if the original inviter is required to confirm an acceptance before a meeting is formed, the acceptor is provided with the option to include a "deadline" for such confirmation. Preferably, the accepting user is provided with the option of submitting a comment to the inviter using (e.g., "The invite says 7 pm, I can only make it by 7:15 pm. Is this ok?") and, preferably the inviting user can respond, preferably via double-blind email.

According to one embodiment, the invitation is posted by at first user and if another user or a second user is interested, that other user ("the accepting user" or "acceptor") transmits (either directly or indirectly) an "acceptance" (if the terms of invite are acceptable) or "counterinvitation" (if the second user needs to modify the original invitation in any manner such as a different time or place) to the inviting user who may approve/confirm/accept, decline or hold the invitation or "counterinvitation". The system communicates the acceptance to or the acceptance is accessible by the inviting party who can either confirm or approve the acceptance (thus establishing the meeting) or decline the acceptance for whatever reason (e.g., accepting party doesn't fit profile, change of plans, etc.) or place on hold for a decision at a later time. Preferably, the inviter may also communicate one or more questions to the accepting party and the acceptor may reply or forward comments to inviter. Preferably, the inviting user can transmit a question or comment to the accepting user prior to, with or after either accepting, declining or holding.

Preferably, the communications between the inviter and accepting users are via doubleblind email and/or are viewable by each user when viewing the invite. Preferably, a user wishing to communicate with other users can select whether the proposed comment would be (a) published with the published invite and viewable by any user using the website; (b) published with the published invite and viewable by any registered user using the website; (c) published with the invite and thus viewable by all approved meeting participants; (d) sent to and/or viewable only by selected users (e.g., selected approved meeting participants); (e) sent to and/or viewable only by the inviter. According to a preferred embodiment, the user is provided with a link or option when viewing an invite to open or access a communication module or page associated with that invite and communicate with one or more or all of the users associated with that invite. Preferably, the comments are displayed with or associated with each username and the user is provided with the options (a)-(d) when creating a comment or communication. Preferably, the comments are not only displayed on or otherwise linked to the invite, but are also emailed to each recipient, preferably via double-blind email. Preferably, the user is able to select whether the communications sent or received are: (a) solely displayed when reviewing the invite (e.g., via a link provided on the invite); (b) solely transmitted via email, preferably double-blind email; or (c) both (a) and (b). Preferably, the user is provided with the option to turn-off email communications, even more preferably the user can have a default setting or turn-off the email communications for individual invites.

According to one preferred embodiment, if the accepting party submits a counterinvitation, the inviting party can either decline or accept the counterinvitation. If the counterinvitation is accepted by the first party/original inviter, the acceptance of the counterinvitation is preferably then communicated to the accepting user/counterinviter. According to one embodiment, the accepting user/counterinviter is required to confirm the counterinvitation to establish the meeting. According to another embodiment, the meeting between the original inviter and the counter inviter is automatically confirmed once the original inviter accepts the counterinvitation.

Preferably, if a counterinvitation is accepted by the original inviter, the original invitation is preferably modified to include the revised terms of the counterinvitation (so that additional invitation seekers can review the updated invitation, which is the counterinvitation, should the invitation allow for additional participants at the meeting). Preferably, the original invite is removed. According to one preferred embodiment, if a counterinvitation is declined, the counterinviter is provided with the option to post the counterinvitation as a new invitation.

According to one embodiment, the inviter can access an update or information relating to the user's posted invitation with information including: (i) the invitation content or content summary; (ii) the number of user acceptances accepted/confirmed by the inviter; (iii) the number or list of user acceptances declined by the user; (iv) the number of users or list of user acceptances on hold; (v) the number of remaining openings for the proposed meeting; (vi) comments or communications. Preferably, the update can be in the form of a list of posted invitations or a calendar of upcoming meetings or proposed meetings.

Another aspect of the invention relates to the categorization, organization and management of invitations.

According to another embodiment, if the user posts an invitation, receives acceptances, and then fails to confirm the acceptances, the system may send an email or other communication to the inviter requesting confirmation so that the accepting users may plan accordingly. Preferably, the other users are provided with the option to have the meeting without the inviter and such users will preferably receive a notification when the other users confirm the meeting should still proceed. If the inviter fails to respond, the user may be asked whether he or she still wants to participate. Alternatively, according to one preferred embodiment, the inviter's personal homepage may be cancelled, the user's profile or usernames labeled with a "blackmark" or other negative rating or indication, and/or fined a certain dollar amount to discourage the posting of "false" invitations or the like.

Similarly, users who accept an invitation but fail to confirm the confirmation or participate in the scheduled meeting may be asked if they want to remain registered or cancel their registration, automatically cancel their personal Web page or profile, and/or fine their personal web page.

Preferably, unacceptable acceptances (e.g., do not match the criteria set forth in the invitation) are screened by the system and such users are not allowed to review or accept such invitations. More specifically, if the inviting user requested to meet with a resident of a town he is visiting (e.g., to learn about the town), and a user who is not a resident of the town transmits or posts a nonconforming acceptance, the system preferably either screens the improper acceptance (e.g., doesn't allow it to be posted or transmitted to the inviter) or "tags" the acceptance as nonconforming so that the inviter can readily recognize that it is improper and not review it or otherwise respond to it.

According to another embodiment multiple acceptances are categorized for the inviter user (e.g., time posted, by closest match, by any time deadlines set for responding, etc.). Preferably, the inviter is notified if an acceptor is someone the inviter has previously met with or is on the inviter's "wishlist" of invitees, or is a user that is highly or negatively rated by other users or the system, etc.

One embodiment relates to a system or method that allows for different levels of invitations and/or users. For example, "premium" invitations (e.g., invitations posted by members having certain privileges based on the user's profile, user ratings, and/or subscription payments) will be made available to certain users (e.g., other premium users).

Another aspect of the invention relates to systems and methods that provides for segregation of certain invitations (e.g., romance oriented invitations or like) from the other invitation so that such segregated invitations will not be searchable by users or otherwise show up in search results unless the user specifically requests such invitations in search criteria. According to another embodiment, invitations may be similarly separated or segregated based on text found in the invite. Preferably, users are provided with the option to include such invites in search results, exclude such invites in search results or search exclusively for such "romance" oriented invitations.

Another aspect of the invention relates to improved methods and systems that allow users to search for invitations of interest.

According to one embodiment, the user can search by the same criteria or categories used for posting an invitation (e.g., limit search by location, time, date, purpose, type of meeting, etc.) or a subset of such criteria (e.g., limit search by location and purpose). According the one preferred embodiment, the search criteria is by location, date and invitee characteristics. According to another preferred embodiment, the search criteria is location and invitee characteristics. According to another preferred embodiment, the search criteria is by location and purpose or keyword(s). According to another, by location and type of meeting. According to yet another, the search criteria includes username (e.g., search for invites posted and/or accepted by particular users).

Another option of the invention allows individuals searching and reviewing invites to designate certain invitations as "maybe" or "wishlist". Preferably, the system provides a "maybe" list associated with the user's profile page. The user may then access the "saved" or "wishlist" invitation from the user's homepage, open and accept. Preferably, the system notifies the user (e.g., via email or otherwise) when only one opening is left and/or when the deadline for accepting invitation is approaching.

Another aspect of the invention relates to improved systems and methods that would allow the users to communicate with each other, preferably anonymously.

According to one embodiment, the inviter can designate in an invitation or the inviter's profile as allowing for responses or questions or comments from the other users, and preferably designate whether such responses, questions or comments are posted with the invitation and/or sent directly to the inviter's email address or the inviter's profile page (e.g., the user's "myprofile" page). One advantage of this functionality would be the ability of the users to better communicate about a proposed invitation, about an upcoming meeting, about a past meeting, or on any other topic. Preferably, an inviter has the option to communicate with any accepting user or pre-selected users and/or to communication with only confirmed meeting participants or with one or more selected users. Preferably, the system allows accepting users to communicate with the inviter and confirmed meeting participants to communicate with one or more of the inviter and/or other confirmed meeting participants. Preferably, the communications are via doubleblind emails and/or viewable via the invite.

Another aspect of the invention relates to an improved method or system for arranging for the exchange or loan of information or tangible products. For example, one embodiment of the invention relates to an on-line method for arranging for an exchange or meeting between two or more users comprising:

(a) receiving a proposed invitation to meet or exchange from an inviter, said proposed invitation comprising proposed invitation information including a description of the proposed transaction and, optionally, a proposed time and place for a proposed meeting; and (b) providing or displaying said proposed invitation information at a location accessible by one or more users, wherein the invitation includes a description of the information or item sought to be exchanged, loaned, borrowed or reviewed, evaluated, etc.

Preferably, the invitation includes a location or location range (e.g., within 10 miles of a specific location) for the exchange and the item(s) which the inviter seeks to exchange (e.g., inviter interested in buying from or selling to the other user), borrow, use or see/evaluate/test (e.g., considering purchasing the product and would like to see it up close). According to a preferred embodiment, the invitation includes a time and/or date or range(s) for time and/or date for the proposed meeting.

According to another preferred embodiment, the invitation includes a deadline for accepting the invite. For example, the inviter may be a traveling individual and realize she has forgotten a power cord for her laptop and urgently requires re-powering her laptop battery. The system allows her to post an invitation for a proposed exchange where she will borrow a replacement power cord from a third party. If the inviter is only going to be at location for four days, the inviter can preferably include that date range in the invitation and also preferably request that any acceptances be made within two days. The inviter's invitation can include the item to be borrowed, her proximate location and range she is willing to travel, a specific place for meeting or a type of meeting place (e.g., will meet at any coffee shop) and an offer to compensate the other person for loaning the power cord.

Another aspect of the invention relates to networking or exchange systems and methods having improved security and reliability characteristics.

Preferably, a username is assigned to new users by default, unless the user selects a unique username.

According to one embodiment, users are required to acknowledge signing up, posting an invitation and/or accepting an invitation via email or cell phone. For example, the system may email or instant message a link or code to the user that the user clicks or inputs into the system to confirm registration.

According to another embodiment, the system does not allow a user to post or accept conflicting or otherwise overlapping invitations.

According to another embodiment, a user can only have less than 100, preferably less then 50, more preferably less than 25 active or unexpired invitations posted or accepted at anytime to reduce "spam" or fraudulent invitations.

According to another embodiment, users are able to contact the system if another user abuses the system or is otherwise disruptive to the service. Preferably, the users are able to designate an invitation or profile as being inappropriate for the site or for the purpose category.

According to another embodiment, users are required to submit a "deposit" (e.g., a credit card account, paypal account, etc.) and are penalized for posting false invitations or falsely accepting invitations or failing to show up to confirmed meetings.

According to one embodiment, users who are found to post fraudulent invitations and/or acceptances may be penalized by having their profile information, including information that the user requested to remain private, published so that other users can better avoid the fraudulent user.

According to one embodiment, the system preferably keeps a record of one or more, preferably all, of the following: (i) the total number of website visitors, (ii) total number of users that are registered and unverified signups, (iii) the total number of invitations posted, (iv) the total number of invitations reviewed, (v) the total number of invitations accepted, (vi) the total number of invitations confirmed and (vii) the total number of meetings completed. Preferably, the system also enables users to rate other users, meetings, and meeting locations, and such ratings are preferably published for review by other users. According to one preferred embodiment, users are able to select whether their personal ratings would be public or private.

The system may also keep a record of statistics relating to an individual user such as total number of invitations posted, accepted or confirmed by the individual user, total number of meetings the individual user participated in and/or list of any such meeting (including when and where such meetings occurred) and total number and/or list of other users the individual user has communicated with, whether at a meeting or via intrasystem mail. Preferably, such information is provided on the user's personal page.

According to one embodiment, an automatic maintenance procedure is provided (e.g., "stale" invitations are deleted). U.S. Pat. No. 5,963,913 to Henneuse et al. Preferably, in order to free up unused space on the system, inactive personal pages may be cancelled. For example, if a user has not logged into the system for three months, he or she may be sent an email message asking him or her whether he or she still wants to be registered in the system. An automatic procedure then asks the user if the user wants to remain registered or wants to be removed from the database. If no reply is received with two weeks, for example, the user's personal profile will be removed automatically.

In one embodiment, the database homepage, personal homepage and/or invitation bulletin board includes advertising graphics. The advertising graphics can be in the form of billboards, links, banners or the like. In one embodiment, the advertiser can design the advertisement and provides the designed advertisement to the system. For example, the advertiser can indicate to the system the location of a graphics file. This may include a URL if the network employed is the Internet, may include a drive and file name if the network employed is an Intranet network, a local area network, or a wide area network, or a graphics file may be transferred if a dial up connection is employed. In one preferred embodiment, the advertiser can decide to have its advertisement displayed only when the user performing a search meets the advertiser's pre-defined profile. For example, if the user has indicated in his profile that he is a golfer, an advertiser of golf products or services may display an advertisement when the user is logged on. Alternatively, the profile of an invitation may also prompt certain advertisements, such as based on the location of a proposed meeting or type of meeting. For example, a restaurant or hotel or a limousine service in New York City may display advertisements to users who post in invitation for or users who are reviewing invitations for New York City. In one embodiment, the advertiser may target certain users by e-mail to their personal webpage.

According to one embodiment, each set of users who confirm a meeting is provided with a temporary "guest identification". The guest identifications can be used to connect with the other individual without exchanging full names. Moreover, users can be instructed to exchange their codes when they meet. Then if one user doesn't show, this can be verified by asking that user for the other user's codes. If the user has it, he can use as verification that he attended the meeting. According to one embodiment, users can be required to submit the other user's verification codes, preferably only if a dispute regarding meeting attendance is presented. Preferably, a user that confirmed a meeting but failed to attend can be penalized, preferably only at the option of the other participants or, according to another embodiment, are penalized unless such penalty is objected to by the other meeting participants (e.g., the other meeting participants received a notification from the other user of the user's inability to attend the meeting or acceptable excuse for not attending after the meeting).

Another aspect of the invention relates to improved methods and systems as described above wherein such methods and systems require user fees or subscription payments or generated other forms of revenues.

As stated above, the users may be "members" or "subscribers" to a service which provides access to the inventive system and method. Preferably, in order to access the system and use its functionality, users are asked to store profile information in the database. Individuals who use the system are preferably then allocated their "personal webpage" that incorporates this profile information. According to one embodiment of the invention, targeted advertisements and/or promotions are sent or displayed to the user based on the user's profile information, meeting calendar or any other information associated with the user.

According to another embodiment, users are required to place an electronic deposit (e.g., using Paypal, credit card, etc.) in exchange for using the system. Preferably, such a deposit could provide additional "quality control" since the users would only be able to use the service without charge if they place a "deposit" (e.g., using a credit card) in order to post an invitation and/or transmit an acceptance. According to one preferred embodiment, if the user fails to honor the invitation or acceptance, the user may forfeit the deposit or a portion of the deposit or otherwise be fined or penalized (e.g., provided with a negative rating).

According to another embodiment, the system, method and/or service may be funded or further funded by user membership fees (e.g., daily, weekly, monthly or yearly) or a fee may be charged for each invitation posted and/or each invitation accepted. Preferably, the purpose and function of such fees is not only to support the system but also to provide an element of quality control for the invitations posted and accepted. For example, a user may be discouraged from using the service if "false" invitations and/or "false" acceptances are posted on the system. A user may believe such an invitation or acceptance is real and show up to the scheduled meeting place only to find that the invitation or acceptance was fraudulent. This would obviously frustrate a user who otherwise may have made other plans or selected a different invitation or acceptance. Such fraudulent activity could decrease the benefits of the inventive system. Thus, the requirement that fees be paid for use of the system or fines charges to those who post fake invitations or acceptance should improve the quality of the service.

According to one preferred embodiment, only computer users who are "members" or "subscribers" of the service can post invitations and/or review, browse and/or search the invitations and/or respond to the invention with an acceptance or counter invitation. One advantage of limiting access to "subscribing" or "member" users is to provide "quality control". That is, subscribers or members would provide the service with personal information including email, residence and/or other identifying information. This would decrease the likelihood of pranks such as the posting of a "fake invitation" or "fake acceptance". A service which provides genuine invitations and acceptances would clearly be advantageous to the users. Alternatively, "quality control" may also be provided by charging users with a fee to post an invitation and/or review, browse, and/or search invitations and/or accept an invitation. For example, the method and system may include a transaction fee and/or a deposit which is charged to the user's credit card or the like.

Another aspect of the invention relates to online messages or advertisements (e.g., banner ads) which when clicked by a user will set up an invite or meeting ("ad-generated invite") or a form to be completed to create such an invite with a vendor or service provider or an agent for an agent or service provider or an employee or representative or affiliate of the advertiser ("Commercial Users"). Such a message or advertisement can be a "request for invitation" in that it is an open request for another user to post the requested invitation for a meeting. For example, a banner may state "Meet with a State Farm Insurance Agent" and when a user clicks or otherwise selects the ad, an ad-generated invite or invite form is automatically generated to meet with a representative of the advertiser. The user selects a time and/or location and the ad-generated invitation is transmitted to the advertiser. Preferably, the ad-generated invitation automatically fills in the user's profile information (e.g., background, location), preferably as default information (e.g., the user can change the location if wishes to meet at another location). Alternatively, the user can fill in the time and location for the proposed meeting. Preferably, the advertiser or the advertiser's agents or representatives are notified (e.g., via mail) that a user has generated such an invite for a meeting so that an employee or representative can be assigned to meet with the user. According to one preferred embodiment, the ad generated invitation is listed (e.g., on an online bulletin board) for review and acceptance by the Commercial Users. Preferably, the posted ad-generated invites are bid for or auctioned to the highest bidder. According to another embodiment, the Commercial Users pay fees to subscribe to access and/or accept such ad-generated invites. According to one preferred embodiment, the advertiser or advertiser's agent or other Commercial User can then accept the ad-generated invitation or counter the invitation (e.g., propose a different time or location). Preferably, the Commercial User's have profiles pages or dashboards, preferably similar to other users. Preferably, the user is notified of any acceptance or counter and a meeting is formed as described above for conventional (e.g., no advertisement) invitations. Preferably, the notification to the user confirms the meeting. According to another preferred embodiment, the user must confirm the Commercial User's acceptance before the meeting is confirmed. Further, users may be allowed to browse for invitations and in searching for invitation, the system may also return in the search results relevant requests for invitations from commercial users. The requests for invitation may be banner advertisements or in another form suitable for inclusion in the search results. In some embodiments, the user who submits a request to browse for invitations may indicate that the search should encompass only invitations (i.e., should exclude requests for invitations), or should include both invitations and requests for invitations, or should include only request for invitations.

According to another embodiment, the advertisement is an invitation posted by an advertiser for a proposed meeting with interested users (e.g., financial planner interested in meeting with potential clients). According to one preferred embodiment, the advertisement invitation includes proposed location. According to another preferred embodiment, the invitation includes or further includes a proposed time. According to another preferred embodiment, the invention includes or further includes the type of meeting (e.g., coffee, lunch, etc.) and/or payment obligation (e.g., advertising party offers to pay). According to yet another embodiment, the advertisement is generic (e.g., "Meet with a Real Estate Agent" or "Meet with a Financial Planner") and any ad-generated invitation created in response to the advertisement is sent to or made available to Commercial Users (e.g., real estate agents or financial planners), preferably as potential business leads. Preferably, the advertiser or other Commercial User is charged a fee for each invitation posted and/or accepted and/or for each meeting held. According to another embodiment, ad-generated invitations are sent to an ad-generated invite distributor and such distributor commercializes the ad-generated invites to Commercial Users. Preferably, the notifications of acceptance are sent from Commercial Users. According to another embodiment, the notifications are sent through the distributor or an agent for the Commercial Users. Accordingly to yet another embodiment, users who post ad generated invitations and/or participant in such meetings are compensated or otherwise awarded for their participation.

A further aspect of the invention relates to integrating into the site vendor services that can be made available to users as they set up meetings. For example, the site may provide interested vendors a button such as "Get Listed as Venue (e.g., Restaurant)" or the like, which when clicked, will cause a page to open asking the vendor for registration information such as, e.g.,: (a) name; (b) address/phone; (c) vendor type (e.g., restaurant, bar, etc.); (d) cuisine; (e) website or link to website; (f) menu, (g) specials, (h) ratings, (i) cost, etc. Upon submission of the information, the system may generate and store the information into a vendor profile in a database. Later, when users are setting up meetings, the site can provide pull down menus or searchable databases to allow users to select registered vendors whose profile information match the type of meeting being set up. For example, if the invite is for dinner, the site requests a food preference and provide selected restaurants in response to the food preference. Preferably, the system would charge the vendors in order for them to submit or list their information on the site, or upon a user selecting the vendors' services to facilitate their meetings.

Accordingly to yet another embodiment, users who select a listed or subscribing venue as a meeting location are compensated or otherwise awarded (e.g., provided with discounts) for their selection.

Figure 9:
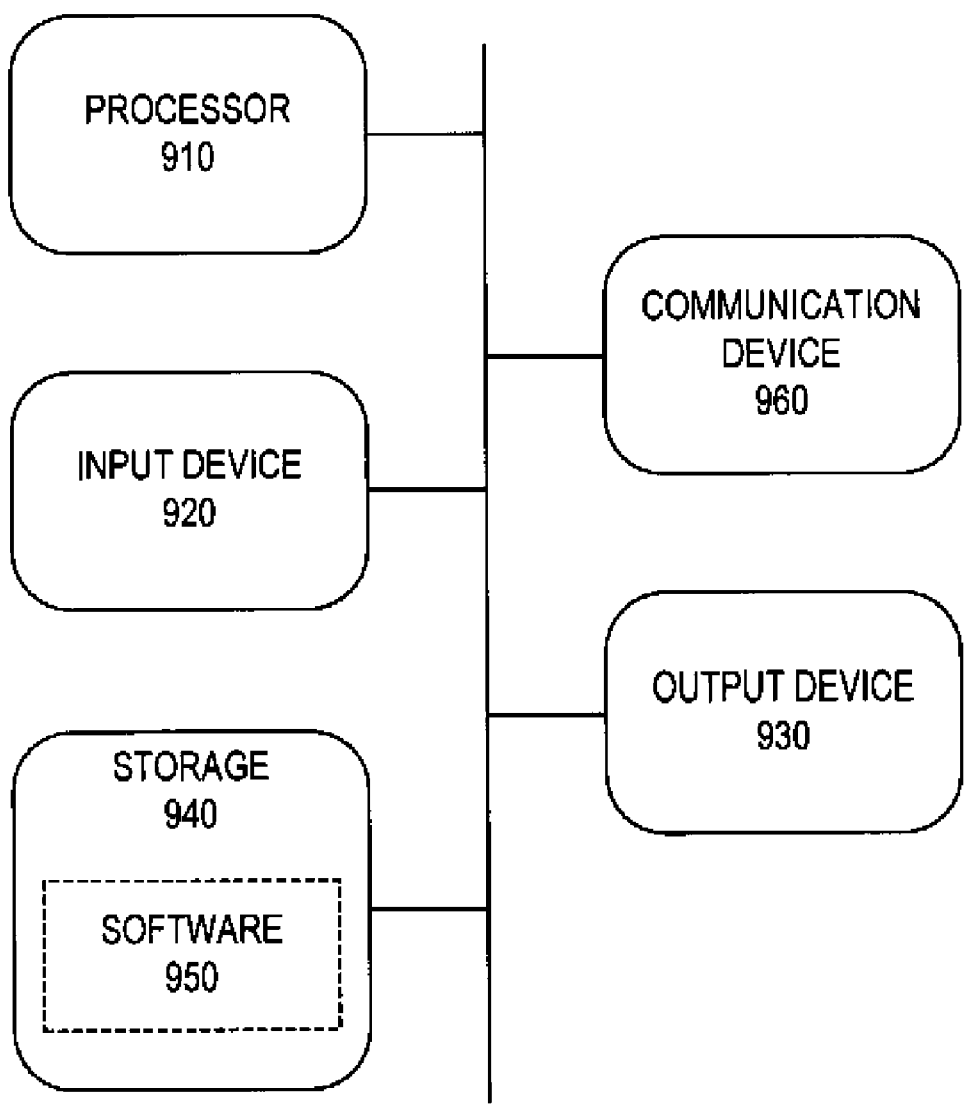
FIG. 9 is a block diagram that depicts a computing device in accordance with an embodiment of the present invention.

FIG. 9 illustrates the components of a basic computing device in accordance with an embodiment of the present invention; a computing device as depicted may constitute any one or more of the user/vendor terminals (100, 110, 120) and a server running the meeting engine (140), for example. The computing device may be a personal computer, workstation, server, or any other type of microprocessor-based device, including for example a mobile electronic device such as a PDA (personal digital assistant) or a mobile telephone. The computing device may include one or more of a processor (910), input device (920), output device (930), storage (940), and communication device (960).

The input device (920) may include a keyboard, mouse, pen-operated touch screen or monitor, voice-recognition device, or any other device that provides input. The output device (930) may include a monitor, printer, disk drive, speakers, or any other device that provides output.

The storage (940) may include volatile and nonvolatile data storage, including one or more electrical, magnetic or optical memories including such as a RAM, cache, hard drive, CD-ROM drive, tape drive or removable storage disk. The communication device (960) may include a modem, network interface card, or any other device capable of transmitting and receiving signals over a network. The components of the computing device may be connected in any manner, such as via electrical bus or wirelessly.

The software (950), which may be stored in the storage (940) and executed by the processor (910), may include, for example, the application programming that embodies the functionality of the present invention (e.g., as embodied in the meeting engine (140)). The software (950) may include a combination of client applications and enterprise servers such as an application server and a database server.

Communications may occur over any type of network (105), which may implement any communications protocol, which may be secured by any security protocol. Network links may include telephone lines, DSL, cable networks, T1 or T3 lines, wireless network connections, or any other arrangement that implements the transmission and reception of network signals.

The computing device may implement any operating system, such as Windows, Linux or UNIX. The software (950) may be written in any programming language, such as C, C++, Java, Ruby on Rails, Visual Basic and/or SQL. In various embodiments, application software embodying the functionality of the present invention may be deployed on a standalone machine, in a client/server arrangement or through a Web browser as a Web-based application or Web service, for example.

With respect to the appended claims, unless stated otherwise, the term "first" does not, by itself, require that there also be a "second".

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention. For example, software modules that implement the present invention such as the meeting engine (140) may comprise several discrete modules that together still provide the same functionality, data specified in the illustrated databases (150, 160, 170) may be spread over several databases and/or systems (e.g., a server may be two or more servers acting together) and the flow diagrams of FIGS. 2-8 may encompass combined steps or several intermediate steps that do not detract from the higher level functionality described therein. As used herein and in the appended claims, a "server" should be understood to refer to one server or more than one server.

What is claimed is:

1. A method for arranging meetings between two or more users, comprising:
    receiving by a server a request from a first user over a network to create an invitation for a proposed meeting;
    determining whether one or more rules associated with invitation creation apply to the request from the first user to create the invitation;
    processing the request if all rules determined to be applicable are satisfied; and
    denying the request if one or more rules determined to be applicable are not satisfied;
    wherein:
        said invitation includes general location information and specific location information for said proposed meeting;
        said server allows other users to view the general location information but not the specific location information before accepting the invitation; and
        said server allows the specific location information to be viewed only by users who have accepted the invitation and have been approved by the first user;
        and wherein (a) said method is performed using one or more computer devices, (b) said first user and said other users do not know each other before said request is received by said server to create said invitation, and (c) said specific location of the meeting is (i) emailed by said server to said users who have accepted the invitation when approved by the first user and/or (ii) viewable via a website by said users who have accepted the invitation when approved by the first user.

2. The method of claim 1, wherein:
    the general location information includes a city or a zip code but does not include a street address or specific venue name; and
    the specific location information includes a street address, specific venue name, or both.

3. The method of claim 1, wherein said specific location information is transmitted to said users who have accepted the invitation in a communication that notifies said users of said approval.

4. The method of claim 1, wherein said other users are charged for accepting said invitation.

5. The method of claim 1, wherein said invitation remains open until a designated number of users accept.

6. The method of claim 1, wherein said invitation includes a deadline for accepting said invitation.

7. The method of claim 1, further comprising automatically archiving invitations created by said first user and first user comments relating to said networking forming first user archived data; and transmitting via email attachment or downloadable format said first user archived data relating to said first user on a scheduled basis or at a request of the first user.

8. The method of claim 7, further comprising providing said first user with a clickable button for said first user archived data.

9. A computer-based method for facilitating loaning or borrowing tangible items between two or more users, comprising:
    receiving by a server a request from a first user over a network to browse for one or more computer-based invitations for proposed meetings from other users to loan or borrow said tangible items, wherein said one or more computer-based invitations comprise information including a description of said tangible items to loan or borrow and said invitation can be viewed only by users having one or more specified user profile characteristics and is not available to users not having said one or more specified user profile characteristics and is not posted on a public invitation bulletin;
    determining whether one or more rules associated with computer-based invitation browsing apply to the request to browse;
    processing the request if all rules determined to be applicable are satisfied;
    denying the request if one or more rules determined to be applicable are not satisfied; and
    providing search results to the first user in response to the request if the request is not denied,
    wherein said search results include one or more of said computer-based invitations to loan or borrow said tangible items and proximate location and range said other users are willing to travel for said loan or borrow and wherein said method is performed using one or more computer devices and wherein said method results in meetings loaning or borrowing said tangible items between two or more users and wherein said two or more users do not know each other before said request is received by said server and wherein said one or more user specified profile characteristics are selected from: (i) work in a certain industry; (ii) graduated from a certain school; (iii) have a specified profession; (iv) current employer; (v) past employer; (vi) professional or social association; or (vii) fraternity/sorority.

10. The method of claim 9, wherein said search results are based on a location of a mobile electronic device carried by said first user and a location and time of the computer-based invitations.

11. The method of claim 9, further comprising allowing the invitation to expire after a time period.

12. The method of claim 9, wherein said specified user profile characteristics are alumni characteristics and said first user and said other users are fellow alumni.

13. A computer-based method for arranging a commercial meeting relating to goods or services between one or more commercial users and one or more interested users, comprising:
    (i) allowing a first commercial user to create a first commercial user account including providing an email address, wherein said first commercial user sells or otherwise commercializes said goods or services;
    (ii) receiving by a server a request to create an invitation from said first commercial user for a proposed commercial meeting, wherein said invitation includes location information for said proposed commercial meeting and information including a description of said goods or services offered by said first commercial user and said invitation can be viewed only by users having one or more specified user profile characteristics and is not available to other users not having said one or more specified user profile characteristics and is not posted on a public invitation bulletin;

(iii) determining whether one or more rules associated with invitation creation apply to the request to create the invitation;
(iv) processing the request if all rules determined to be applicable are satisfied;
(v) denying the request if one or more rules determined to be applicable are not satisfied;
(vi) transmitting said invitation to interested users including potential clients via email after said processing, wherein:
said interested users are users interested in said goods or services offered by said first commercial user;
one or more of said interested users accepts said invitation for said commercial meeting;
said method results in said commercial meeting whereby said first commercial user sells or otherwise commercializes said goods or services to said one or more interested users; and
wherein said steps (i)-(vi) are performed using one or more computer devices and
wherein: (a) said invitation includes a deadline for accepting said invite;
(b) said invitation will expire after a time period;
(c) said invitation stays open until a designated number of users accept;
(d) said commercial user is charged for said commercial meeting; and
(e) said one or more interested users are charged for accepting said invitation for said commercial meeting.

14. The method of claim 13, further comprising allowing said interested users to register by providing an email address.

15. The method of claim 13, wherein said commercial user and said one or more interested users do not know each other prior to said acceptance by said one or more interested users.

16. The method of claim 13, wherein said commercial user is charged a fee for said commercial meeting.

17. The method of claim 13, further comprising repeating steps (i)-(vi) a plurality of times to arrange a plurality of said commercial meetings, wherein said plurality of meetings includes at least 1000 commercial meetings.

18. A method for arranging meetings between two or more users, comprising:
receiving by a server a request from a first user over a network to create an invitation for a proposed meeting;
determining whether one or more rules associated with invitation creation apply to the request from the first user to create the invitation;
processing the request if all rules determined to be applicable are satisfied; and
denying the request if one or more rules determined to be applicable are not satisfied;
wherein:
said invitation includes general location information and specific location information for said proposed meeting;
said server allows other users to view the general location information but not the specific location information before accepting the invitation; and
said server allows the specific location information to be viewed only by users who have accepted the invitation and have been approved by the first user;
and wherein (a) said method is performed using one or more computer devices, (b) said first user and said other users do not know each other before said request is received by said server to create said invitation, and (c) said specific location of the meeting is (i) emailed by said server to said users who have accepted the invitation when approved by the first user and/or (ii) viewable via a website by said users who have accepted the invitation when approved by the first user; and
wherein: the general location information includes a city or a zip code but does not include a street address or specific venue name; and the specific location information includes a street address, specific venue name, or both; and wherein said specific location information is transmitted to said users who have accepted the invitation in a communication that notifies said users of said approval.

19. A method for arranging meetings between two or more users, comprising:
receiving by a server a request from a first user over a network to create an invitation for a proposed meeting;
determining whether one or more rules associated with invitation creation apply to the request from the first user to create the invitation;
processing the request if all rules determined to be applicable are satisfied; and
denying the request if one or more rules determined to be applicable are not satisfied;
wherein:
said invitation includes general location information and specific location information for said proposed meeting;
said server allows other users to view the general location information but not the specific location information before accepting the invitation; and
said server allows the specific location information to be viewed only by users who have accepted the invitation and have been approved by the first user;
and wherein (a) said method is performed using one or more computer devices, (b) said first user and said other users do not know each other before said request is received by said server to create said invitation, and (c) said specific location of the meeting is (i) emailed by said server to said users who have accepted the invitation when approved by the first user and/or (ii) viewable via a website by said users who have accepted the invitation when approved by the first user and wherein said invitation can be viewed only by other users having one or more specified user profile characteristics and is not available to users not having said one or more specified user profile characteristics.

20. A computer-based method for arranging a commercial meeting relating to goods or services between one or more commercial users and one or more interested users, comprising:
(i) allowing a first commercail user to create a first commercial user account including providing an email address, wherein said first commercial user sells or otherwise commercializes said goods or services;
(ii) receiving by a server a request to create an invitation from said first commercial user for a proposed commercial meeting, wherein said invitation includes location information for said proposed commercial meeting and information including a description of said goods or services offered by said first commercial user and said invitation can be viewed only by users having one or more specified user profile characteristics and is not available to other users not having said one or more specified user profile characteristics and is not posted on a public invitation bulletin;

(iii) determining whether one or more rules associated with invitation creation apply to the request to create the invitation;
(iv) processing the request if all rules determined to be applicable are satisfied;
(v) denying the request if one or more rules determined to be applicable are not satisfied;
(vi) transmitting said invitation to interested users including potential clients via email after said processing, wherein:
- said interested users are users interested in said goods or services offered by said first commercial user;
- one or more of said interested users accepts said invitation for said commercial meeting;
- said method results in said commercial meeting whereby said first commercial user sells or otherwise commercializes said goods or services to said one or more interested users; and
- wherein said steps (i)-(vi) are preformed using one or more computer devices and wherein:
(a) said invitation includes a deadline for accepting said invite;
(b) said invitation will expire after a time period;
(c) said invitation stays open until a designated number of users accept;
(d) said commercial user is charged for said commercial meeting;
(e) said one or more interested users are charged for accepting said invitation for said commercial meeting;
(f) said commercial user and said one or more interested users do not know each other prior to said acceptance by said one or more interested users; and
said interested users register by providing an email address.

21. A computer-based method for arranging a commercial meeting relating to goods or services between one or more commercial users and one or more interested users, comprising:
(i) allowing a first commercial user to create a first commercial user account including providing an email address, wherein said first commercial user sells or otherwise commercializes said goods or services;
(ii) receiving by a server a request to create an invitation from said first commercial user for a proposed commercial meeting, wherein said invitation includes location information for said proposed commercial meeting and information including a description of said goods or services offered by said first commercial user and said invitation can be viewed only by users having one or more specified user profile characteristics and is not available to other users not having said one or more specified user profile characteristics and is not posted on a public invitation bulletin;
(iii) determining whether one or more rules associated with invitation creation apply to the request to create the invitation;
(iv) processing the request if all rules determined to be applicable are satisfied;
(v) denying the request if one or more rules determined to be applicable are not satisfied;
(vi) transmitting said invitation to interested users including potential clients via email after said processing, wherein:
- said interested users are users interested in said goods or services offered by said first commercial user;
- one or more of said interested users accepts said invitation for said commercial meeting;
- said method results in said commercial meeting whereby said first commercial user sells or otherwise commercializes said goods or services to said one or more interested users; and
- wherein said steps (i)-(vi) are preformed using one or more computer devices and wherein:
(a) said invitation includes a deadline for accepting said invite;
(b) said invitation will expire after a time period;
(c) said invitation stays open until a designated number of users accepts;
(d) said commercial user is charged for said commercial meeting;
(e) said one or more interested users are charged for accepting said invitation for said commercial meeting; and
(f) one or more specified user profile characteristic are selected from: work in a certain industry; graduated from a certain school; have a specified profession; current employer; past employer; professional or social association; or fraternity/sorority.

* * * * *